United States Patent [19]

Meyerhoefer et al.

[11] Patent Number: 5,553,136
[45] Date of Patent: Sep. 3, 1996

[54] MODULAR DEVICE FOR TELEPHONE NETWORK INTERFACE APPARATUS

[75] Inventors: Carl H. Meyerhoefer, Dix Hills; Thomas J. Smith, Bayshore; Adolfo M. Escobar, Holbrook; Robert J. Cannetti, Deer Park, all of N.Y.

[73] Assignee: TII Industries, Inc., Copiague, N.Y.

[21] Appl. No.: 576,398

[22] Filed: Dec. 21, 1995

Related U.S. Application Data

[63] Continuation of Ser. No. 245,974, May 19, 1994, abandoned.

[51] Int. Cl.$^6$ ..................................................... H04M 9/00
[52] U.S. Cl. ........................ 379/399; 379/412; 379/326; 379/29; 379/327
[58] Field of Search .......................... 379/442, 397, 379/441, 399, 422, 423, 327, 328, 329, 330, 331, 332, 165, 156, 100, 412, 326, 29; 439/489

[56] References Cited

U.S. PATENT DOCUMENTS

| | | | |
|---|---|---|---|
| D. 291,081 | 7/1987 | Mickelson et al. | D14/240 |
| D. 313,417 | 1/1991 | Graham et al. | D14/240 |
| D. 313,803 | 1/1991 | Collins et al. | D14/240 |
| D. 314,385 | 2/1991 | Karan et al. | D14/140 |
| D. 315,140 | 3/1991 | Dowler | D13/133 |
| D. 318,653 | 7/1991 | Nieves et al. | D13/184 |
| D. 324,207 | 2/1992 | Nieves | D13/184 |
| 3,166,649 | 1/1965 | Frantz et al. | 200/51.1 |
| 3,536,870 | 10/1970 | Izumi | 200/51.1 |
| 4,070,557 | 1/1978 | Ostapovitch | 200/51.1 |
| 4,087,151 | 5/1978 | Robert et al. | 439/188 |
| 4,179,173 | 12/1979 | Rise, III | 439/507 |
| 4,179,178 | 12/1979 | Bachman et al. | 439/59 |
| 4,212,047 | 7/1980 | Napiorkowski | 361/124 |
| 4,224,485 | 9/1980 | Krumreich | 200/51.1 |
| 4,274,691 | 6/1981 | Abernethy et al. | 439/507 |
| 4,373,120 | 2/1983 | McDonald | 379/442 |
| 4,398,784 | 8/1983 | Takihara | 439/668 |
| 4,438,303 | 3/1984 | Astier | 200/51.1 |
| 4,457,570 | 7/1984 | Bogese, II | 439/59 |
| 4,552,423 | 11/1985 | Swengel, Jr. | 439/507 |
| 4,588,238 | 5/1986 | Mickelson et al. | 439/345 |
| 4,633,048 | 12/1986 | Komatsu | 200/51.1 |
| 4,647,725 | 3/1987 | Dellinger et al. | 379/399 |
| 4,651,340 | 3/1987 | Marson | 379/156 |
| 4,695,116 | 9/1987 | Bailey et al. | 439/188 |
| 4,699,443 | 10/1987 | Goodrich et al. | 439/188 |
| 4,700,385 | 10/1987 | Disomone | 379/442 |
| 4,712,232 | 12/1987 | Rodgers | 379/328 |
| 4,715,058 | 12/1987 | Lechner et al. | 379/442 |
| 4,723,919 | 2/1988 | Crane | 439/521 |
| 4,725,241 | 2/1988 | Bertini et al. | 439/188 |
| 4,747,018 | 5/1988 | Munsey et al. | 379/332 |
| 4,747,020 | 5/1988 | Brickley et al. | 379/327 |
| 4,749,359 | 6/1988 | White | 439/133 |
| 4,773,878 | 9/1988 | Hansell, III | 439/497 |
| 4,782,245 | 11/1988 | Henry | 379/327 |
| 4,782,480 | 11/1988 | Hargrave et al. | 379/332 |
| 4,796,289 | 1/1989 | Masor | 379/399 |
| 4,798,542 | 1/1989 | Asick et al. | 439/188 |
| 4,823,381 | 4/1989 | Olson | 379/327 |
| 4,825,466 | 4/1989 | Dowler et al. | 379/445 |
| 4,829,564 | 5/1989 | Jarvis | 379/327 |
| 4,832,614 | 5/1989 | Jenkins | 439/188 |
| 4,850,888 | 7/1989 | Denlinger et al. | 439/188 |
| 4,863,393 | 9/1989 | Ward et al. | 439/188 |

(List continued on next page.)

Primary Examiner—Krista M. Zele
Assistant Examiner—Scott Wolinsky
Attorney, Agent, or Firm—Morgan & Finnegan

[57] ABSTRACT

A modular device for connecting telephone company wiring and subscriber telephone wiring in a telephone network interface apparatus, the modular device having a replaceable protection and/or electronics unit, a plug-actuated switchable socket or a switch connected to an external socket for providing a point of demarcation between the telephone company wiring and the subscriber wiring, wire termination mechanisms for terminating and unterminating the telco and subscriber wiring at the network interface apparatus without the use of tools and slidable security covers.

63 Claims, 20 Drawing Sheets

U.S. PATENT DOCUMENTS

| | | | |
|---|---|---|---|
| 4,865,564 | 9/1989 | Denkmann et al. | 379/399 |
| 4,905,119 | 2/1990 | Webb | 379/331 |
| 4,915,649 | 4/1990 | Shimazu et al. | 439/490 |
| 4,932,051 | 6/1990 | Karan et al. | 379/399 |
| 4,945,559 | 7/1990 | Collins et al. | 379/442 |
| 4,949,376 | 8/1990 | Nieves et al. | 379/442 |
| 4,954,672 | 9/1990 | Ruehl | 379/442 |
| 4,979,209 | 12/1990 | Collins et al. | 379/399 |
| 4,980,909 | 12/1990 | Meyerhoefer et al. | 379/327 |
| 4,988,311 | 1/1991 | Tanzola | 439/404 |
| 5,004,433 | 4/1991 | Daoud | 439/502 |
| 5,006,675 | 4/1991 | Sakaguchi | 200/51.09 |
| 5,008,772 | 4/1991 | Neuwirth et al. | 361/119 |
| 5,013,877 | 5/1991 | Jervis | 200/523 |
| 5,014,299 | 5/1991 | Klupt et al. | 379/165 |
| 5,025,345 | 6/1991 | Marks | 361/119 |
| 5,027,100 | 6/1991 | Neuwirth et al. | 337/32 |
| 5,030,123 | 7/1991 | Silver | 439/188 |
| 5,056,132 | 10/1991 | Coleman et al. | 379/100 |
| 5,061,204 | 10/1991 | Murakami | 439/489 |
| 5,074,801 | 12/1991 | Siemon | 439/188 |
| 5,080,607 | 1/1992 | Cristescu | 439/491 |
| 5,083,941 | 1/1992 | Rodgers et al. | 379/328 |
| 5,089,670 | 2/1992 | Chen | 200/1 A |
| 5,092,785 | 3/1992 | Chen | 439/188 |
| 5,108,300 | 4/1992 | Weber | 439/188 |
| 5,123,854 | 6/1992 | Petersen et al. | 439/188 |
| 5,127,847 | 7/1992 | Kato et al. | 439/489 |
| 5,127,848 | 7/1992 | Taguchi | 439/489 |
| 5,131,865 | 7/1992 | Taguchi et al. | 439/489 |
| 5,145,356 | 9/1992 | Minnis | 439/352 |
| 5,153,910 | 10/1992 | Mickelson et al. | 379/399 |
| 5,153,911 | 10/1992 | Smith | 379/399 |
| 5,161,183 | 11/1992 | Maytum | 379/331 |
| 5,173,060 | 12/1992 | Shimirak et al. | 439/416 |
| 5,175,662 | 12/1992 | DeBalko et al. | 361/119 |
| 5,177,782 | 1/1993 | Henderson et al. | 379/412 |
| 5,178,554 | 1/1993 | Siemon et al. | 439/188 |
| 5,207,583 | 5/1993 | DeBalko et al. | 439/49 |
| 5,233,501 | 8/1993 | Allen et al. | 361/733 |
| 5,235,638 | 8/1993 | Dondero | 379/399 |
| 5,260,994 | 11/1993 | Suffi | 379/399 |
| 5,263,872 | 11/1993 | Marpoe, Jr. et al. | 439/188 |
| 5,273,449 | 12/1993 | Mattis et al. | 439/201 |
| 5,277,608 | 1/1994 | Oda | 439/188 |
| 5,291,553 | 3/1994 | Smith | 379/399 |
| 5,296,646 | 3/1994 | Capper et al. | 174/51 |
| 5,297,199 | 3/1994 | Graham et al. | 379/399 |
| 5,313,519 | 5/1994 | Mickelson et al. | 379/399 |
| 5,333,193 | 7/1994 | Cote et al. | 379/399 |
| 5,355,408 | 10/1994 | Lanquist et al. | 379/397 |
| 5,394,466 | 2/1995 | Schneider et al. | 379/399 |
| 5,414,765 | 5/1995 | Lanquist et al. | 379/399 |

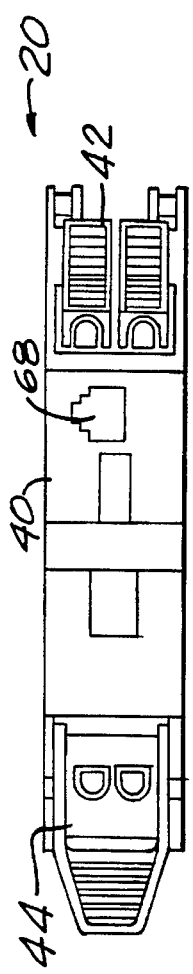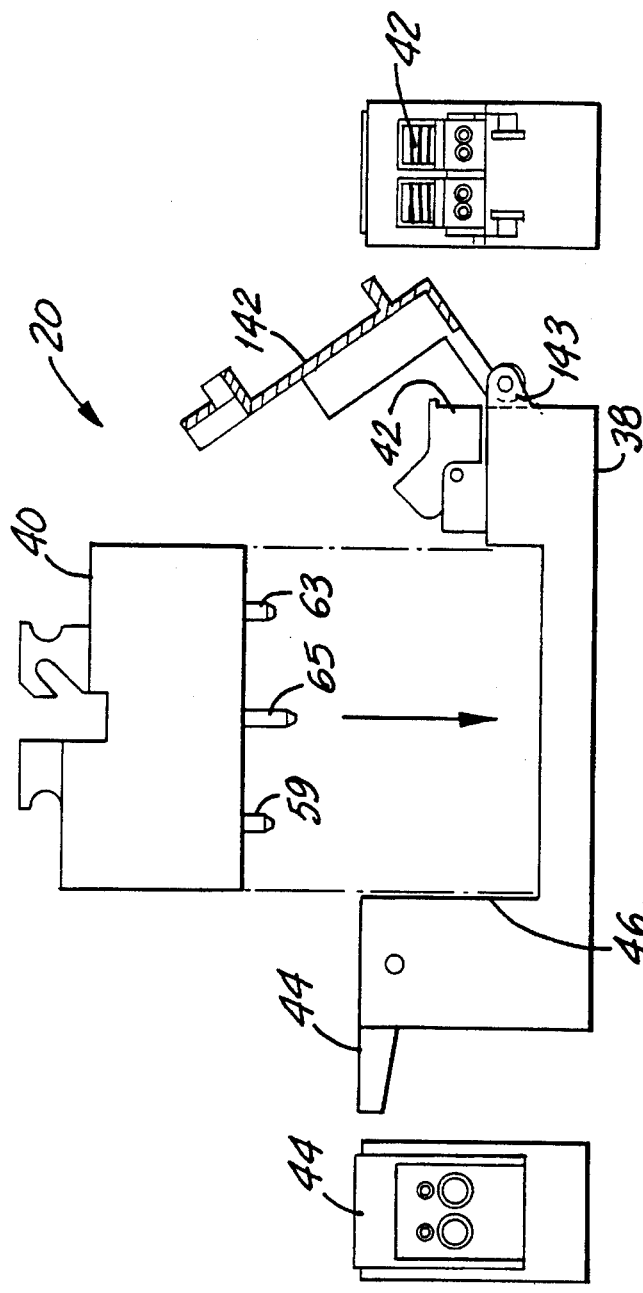

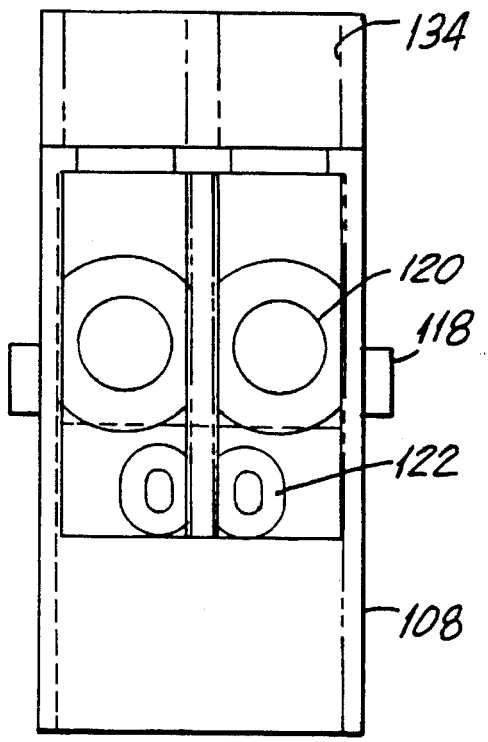
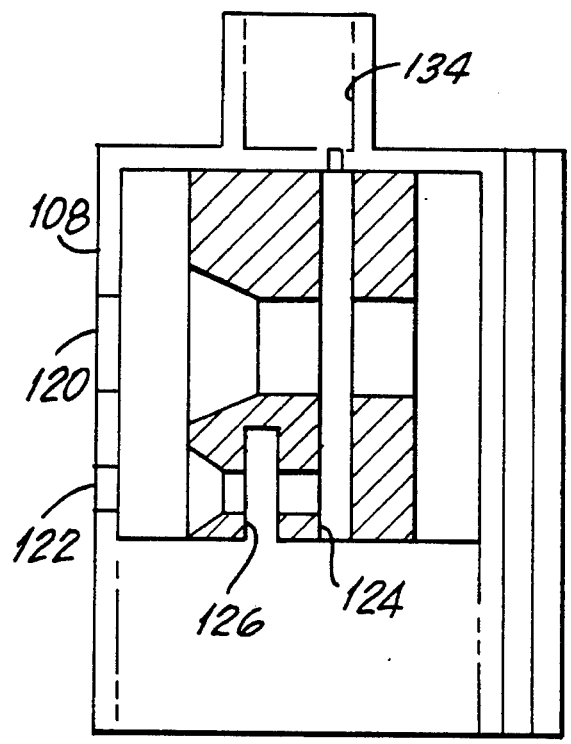
FIG. 27　　　　FIG. 28
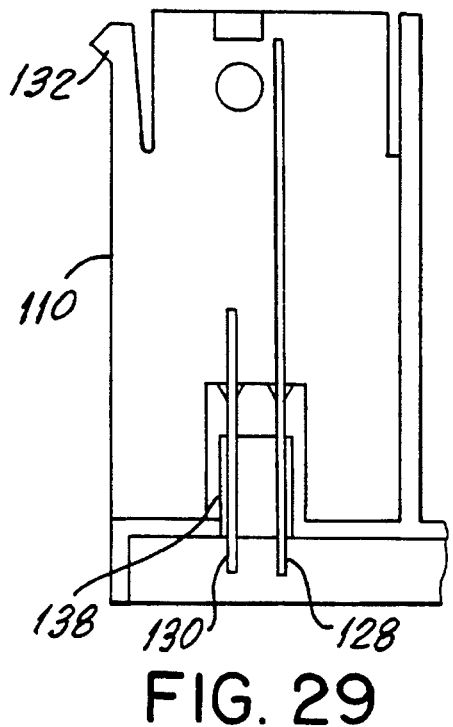
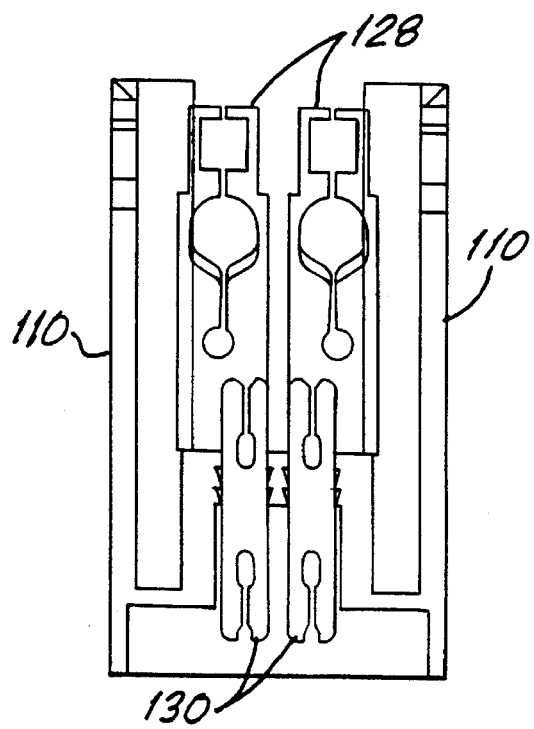
FIG. 29　　　　FIG. 30

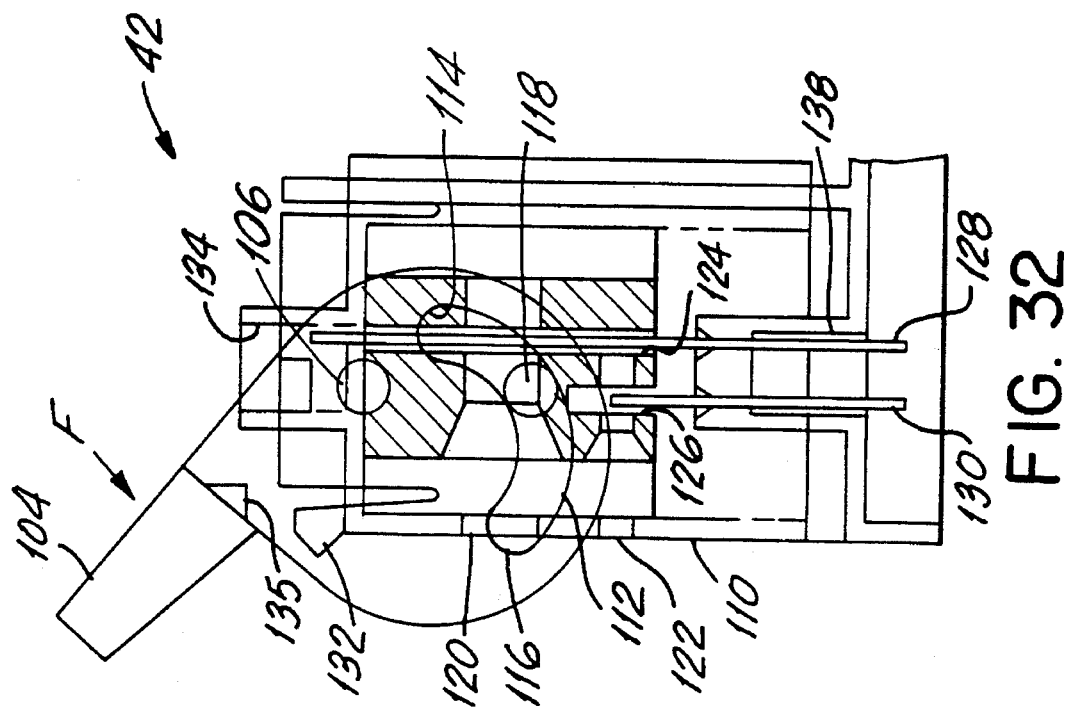
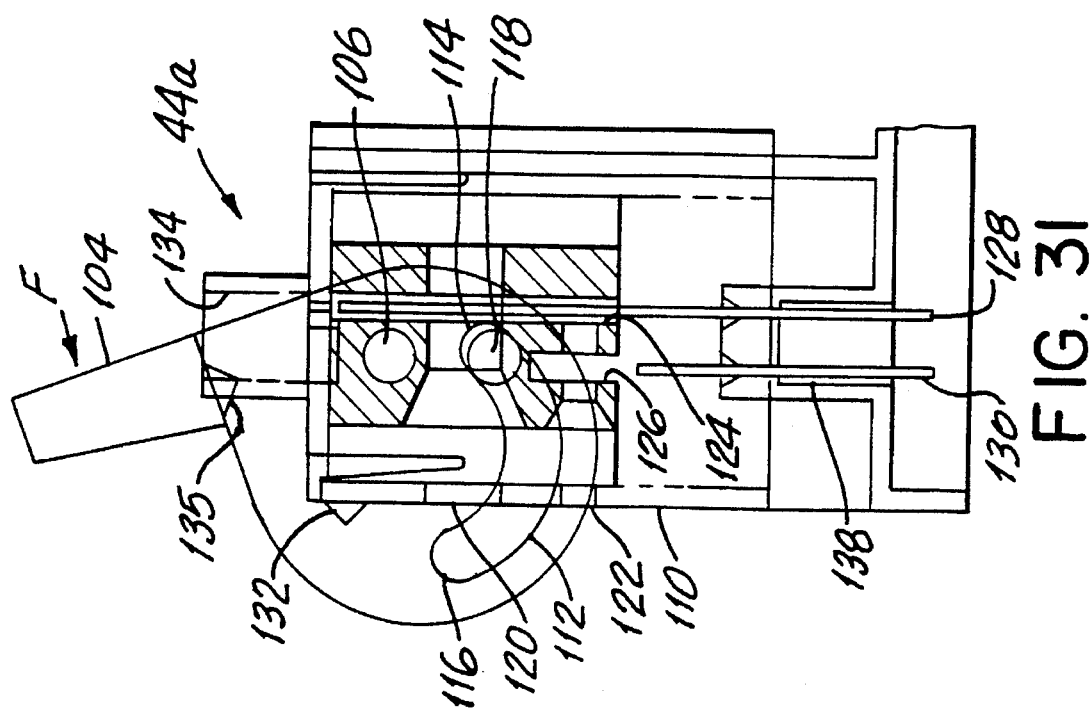

MODULAR DEVICE FOR TELEPHONE NETWORK INTERFACE APPARATUS

This is a continuation of application Ser. No. 08/245,974, filed on May 19, 1994, now abandoned.

BACKGROUND OF THE INVENTION

1. Field of the Invention

The present invention relates to telephone network interface apparatus and to modular devices for interconnecting telephone company ("telco") wiring and subscriber telephone wiring. In particular, the invention relates to a modular device having a replaceable protection unit with overvoltage protection and/or transient protection and a replaceable electronics unit with a maintenance termination unit and/or a half ringer. The protection and electronics units may be integrated to form a single replaceable protection/ electronics unit. The modular device may also have a plug-actuated switchable socket or a switch connected to an external socket for providing a point of demarcation between the telco wiring and the subscriber wiring such that an operating telephone can be plugged into the socket to determine whether a fault exists in the telco equipment or the subscriber premises. In addition, the modular device may have tool-less wire termination mechanisms for terminating and unterminating the telco and subscriber wiring at the modular network interface device without the use of tools.

2. Discussion of Related Art

Telephone subscribers may purchase and install their own telephone equipment and related appliances. Those subscribers are responsible for the proper operation of their equipment and the telephone company is responsible for service only up to the juncture between the telco wiring and the subscriber wiring. Thus, it is desirable to provide a telephone network interface apparatus which allows connection and disconnection of subscriber wiring from telco wiring so that the subscriber can readily isolate problems to the telco or subscriber equipment.

Modular devices are now available for use in telephone network interface apparatus that permit connecting and disconnecting the subscriber and telco wiring. Typical in the art are the modular devices shown in U.S. Pat. No. 4,979,209 issued to Thomas J. Collins et al. on Dec. 18, 1990, U.S. Pat. No. 5,153,910 issued to N. Peter Mickelson et al. on Oct. 6, 1992, U.S. Pat. No. 5,291,553 issued to Thomas J. Smith on Mar. 1, 1994 and U.S. Pat. No. 5,297,199 issued to Thomas G. Graham et al. on Mar. 22, 1994. There remains, however, a need in the art for easily installable modular devices having low cost and maintenance and increased functionality and reliability.

The Collins et al., Mickelson et al. and Graham et al. patents disclose modular devices having an RJ-11 telephone plug connected to the subscriber wiring and an RJ-11 telephone socket connected to the telco wiring to form a series electrical connection between the telco and subscriber wiring. When the plug is removed from the socket, the subscriber wires are disconnected from the telco wires and the subscriber may plug an operating telephone into the socket to determine whether a fault exists with the telco or subscriber equipment. The Mickelson et al. patent discloses a protective element and a test circuit as permanent parts of the modular device. The Collins et al. and Graham et al. patents disclose an internal space in the modular device for a telephone circuit. The Collins et al. patent further discloses overvoltage protection devices separate from the modular devices. The Collins et al., Mickelson et al. and Graham et al. patents disclose connecting the subscriber wires and the telco wires using screws and/or nuts.

The Smith patent discloses a modular device with a special, normally conducting RJ-11 socket to connect the telco and subscriber wiring. This special socket is also disclosed in U.S. Pat. No. 5,030,123 issued to C. Kevin Silver on Jul. 9, 1991. When a telephone is plugged into the socket, the subscriber lines are disconnected from the telco lines and the telephone is connected to the telco lines through the contacts in the socket. As an alternative embodiment, the Smith patent discloses a conventional RJ-11 socket and a conductive cap member to complete the circuit between the telco and subscriber wiring. When the cap member is removed from the socket, the subscriber wires are disconnected from the telco wires and a telephone can be plugged into the socket to determine the location of the fault. The Smith patent further discloses an overvoltage protection device and a specific terminating impedance for the telco wires as a permanent part of the modular device. Finally, the Smith patent discloses connecting the subscriber wires to terminals using screws and connecting the telco wires to terminals using nuts.

The prior art also discloses that telco and subscriber wires may be terminated using insulation displacement contacts. U.S. Pat. No. 5,153,911 issued to Thomas J. Smith on Oct. 6, 1992 discloses a weatherproof telephone terminal apparatus which employs a bolt which is turned to drive two mating parts together to force wires into slots in the insulation displacement contacts. U.S. Pat. No. 4,988,311 issued to Charles Tanzola on Jan. 9, 1991 shows a similar termination method. U.S. Pat. No. 5,273,449 issued to John S. Mattis et al. on Dec. 28, 1993 shows a method for attaching telephone "drop wires" to a plug in which wires are inserted into the plug and a cover is snapped shut, driving the wires into slots in the insulation displacement contacts. The Mattis et al. patent also discloses using a reenterable gel material in connection with the insulation displacement contacts.

U.S. Pat. No. 5,235,638 issued to Paul C. Dondero on Aug. 10, 1993 discloses a telephone network interface apparatus having separate telco and subscriber compartments. The subscriber compartment contains sets of modular devices while the telco compartment has sockets for receiving plug-in overvoltage protection modules and plug-in electronics modules which form side-by-side protector and electronics fields. U.S. Pat. No. 5,025,345 issued to Robert J. Marks on Jun. 18, 1991 discloses an overvoltage protection module with an integral 5-pin plug for use in a protection field. U.S. Pat. No. 5,175,662 issued to George A. DeBalko et al. on Dec. 29, 1992 discloses a module with an integral 5-pin plug which includes both overvoltage protection and a maintenance termination unit. U.S. Pat. No. 5,260,994 issued to Lou Suffi on Nov. 9, 1993 discloses a modular maintenance termination unit with a 5-pin plug which contains, as part of the module, a telephone socket and a telephone plug.

Finally, U.S. Pat. No. 1,303,383 issued to Ralph W. Osborne on May 13, 1919 and U.S. Pat. No. 4,433,212 issued to Donald W. Moses et al. on Feb. 21, 1984 disclose the use of inductances in series with telco lines.

SUMMARY OF THE INVENTION

The present invention overcomes many of the disadvantages of the prior art network interface devices as exemplified by the various patents already discussed.

In one embodiment of the present invention the modular device contains a replaceable protection and/or electronics unit. The replaceable unit may include an overvoltage protection device in the form of a gas tube, a transient protection device in the form of a series inductances, a maintenance termination unit or a ringer simulator (half ringer). Although the prior art discloses replaceable protection and/or electronics units, they are not shown as part of the modular device. Similarly, although the prior art discloses modular devices having both line termination impedance circuitry and overvoltage protection devices, they were a permanent part of the module such that, in the event of a problem with the overvoltage protection device or the line termination impedance circuitry, the entire module would have to be replaced. The present invention provides a modular device with a replaceable protection and/or electronics unit. Moreover, the present invention permits using various different protection and/or electronics units in the same modular device in response to changing needs of the telephone company or the subscriber.

In the prior art modular devices the telco and subscriber wires were connected together through the contacts in RJ-11 plugs and sockets. The contacts in RJ-11 plugs and sockets are relatively small gauge, typically 24 AWG or 25 AWG. Such small gauge contacts have limited current carrying capacity. The present invention eliminates the use of such small gauge contacts from the series connection between the telco and subscriber wires, thereby increasing the reliability of the network interface device. The present invention does so by connecting the telco and subscriber wires through a switch located on the modular device which can take the form of a plug-actuated switchable socket or a momentary contact switch. The switch contacts are at least about 20 AWG and preferably at least about 18 AWG equivalent. The contacts which mate with the plug are only connected to the telco lines when the plug is inserted in the socket and, therefore, may be smaller gauge such as 24 AWG or 25 AWG. Thus, while the present invention increases the reliability of the telephone network interface apparatus, it still provides a point of demarcation between the telco and subscriber equipment so that a subscriber can determine whether a fault exists in the telco or subscriber equipment.

The present invention provides for terminating and unterminating the subscriber wires and the telco wires at the modular device using a minimal amount of force and without the need for tools such as screwdrivers, pliers, crescent wrenches or nut drivers. In the present invention, smaller gauge wires, such as the 24 AWG or 22 AWG wires typical of subscriber wiring, may be terminated using a rocker arm termination mechanism to drive the wires into slots in insulation displacement contacts. Rocker arms may be used because a large amount of force is not required to effect the termination of such smaller gauge wires. Also, the rocker arm mechanism permits unterminating the wires without the use of tools.

Telco wires are frequently 18 AWG copper clad steel wires. Rocker arms, while suitable for terminating smaller gauge wires using insulation displacement contacts, may not be suitable for terminating such larger gauge wires because of the additional force required. In the present invention, a lever and cam mechanism provides the additional force required to drive the larger gauge wires into slots in insulation displacement contacts. The cam provides a mechanical advantage which permits the use of a small lever arm while, at the same time, providing the required force. The small lever arm is particularly advantageous because the enclosures containing the modular devices frequently are small and crowded. In addition, the larger gauge wires can be unterminated by merely lifting up on the lever arm without the use of tools because the force required to make the termination is not uniform throughout the travel of the lever arm, the force needed near the end of the termination process being considerably less than the force needed in the middle of the termination process.

The present invention also provides for individual subscriber security covers which limit access to the subscriber portion of the modular device. The security covers may be hinged to the modular device or may have projections which ride in channels on the telco cover such that telco employees can gain access to the subscriber portion of the modular devices.

The foregoing and other advantages of the present invention will become apparent from the following description of the preferred embodiment which are intended to illustrate but not limit the invention.

DESCRIPTION OF THE DRAWINGS

FIG. 6 is a side view of an embodiment of the modular device showing a replaceable protection/electronics unit.

FIG. 7 is a front view of an embodiment of the modular device.

FIG. 8 is a rear view of an embodiment of the modular device.

FIG. 9 is top view of an embodiment of the modular device.

FIG. 27 is a front view of a main body portion for use in the cam actuated wire termination mechanism.

FIG. 28 is a cross-sectional view of the main body portion for use in the cam actuated wire termination mechanism.

FIG. 29 is a side view of a portion of the modular device showing mounting hardware for the cam actuated wire termination mechanism.

FIG. 30 is a front view of a portion of the modular device showing mounting hardware for a cam actuated wire termination mechanism.

FIGS. 31, 32, 33 and 34 are side views of the cam actuated wire termination mechanism.

DESCRIPTION OF PREFERRED EMBODIMENTS

Figure 1:
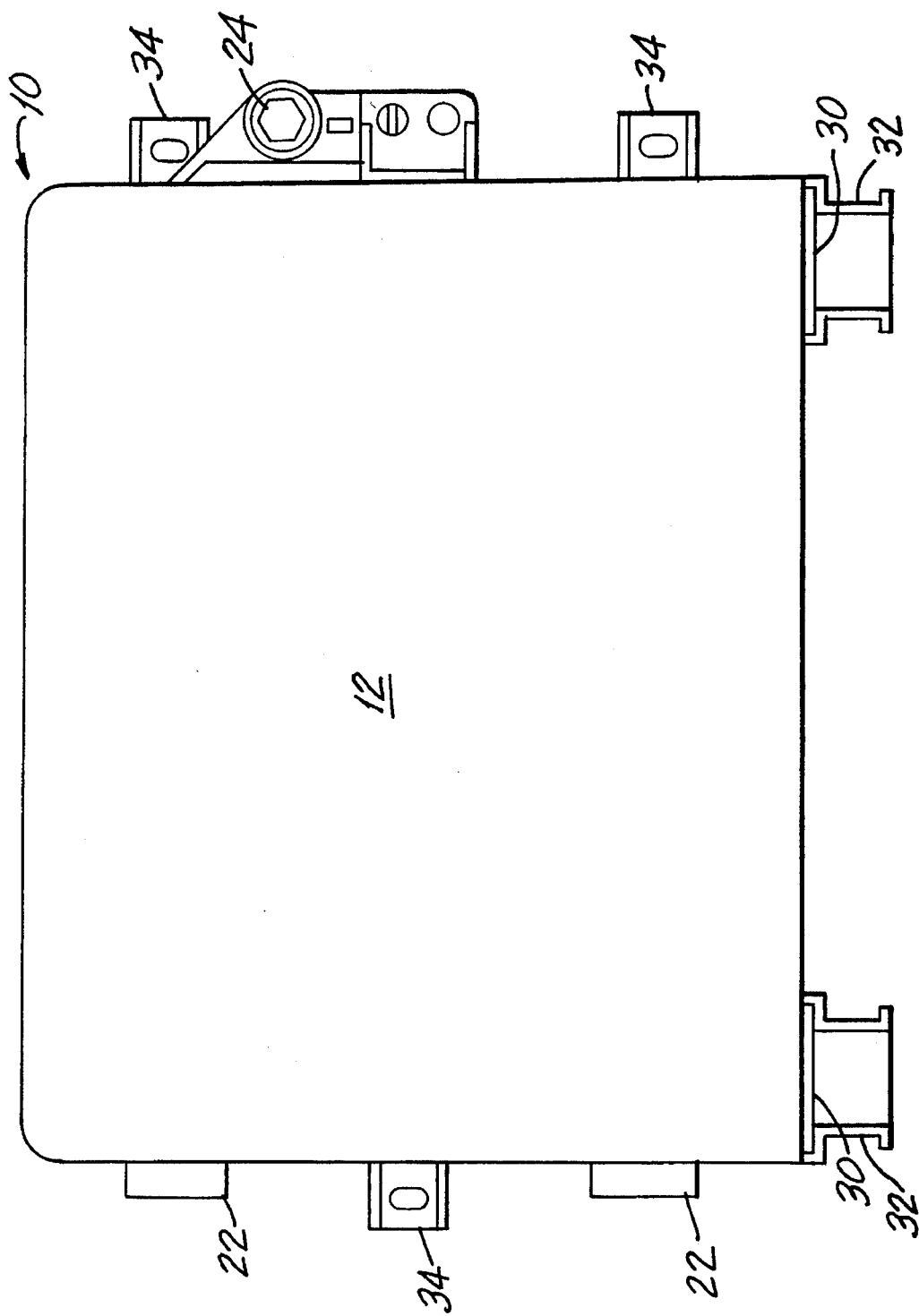
FIG. 1 is a top view of a telephone network interface apparatus with the subscriber cover in a closed position.

Referring to the figures, and in particular FIGS. 1–5, there is shown a telephone network interface apparatus 10 according to the principles of the present invention. The telephone network interface apparatus 10 includes a subscriber cover 12, a telco cover 14, a base 16 and modular devices 18 and 20. The subscriber cover 12 and telco cover 14 are attached by hinges 22 to the base 16 of the telephone network interface apparatus 10.

The subscriber cover 12 is secured in a closed position by conventional fastener 24 as shown in FIG. 1. Upon removing fastener 24, the subscriber cover can be rotated to an open position. When the subscriber cover 12 is open, as shown in FIG. 2, the subscriber compartment and the subscriber portions of modular devices 18 and 20 are visible.

The telco cover 14 is secured in a closed position by fastener 26. When the subscriber cover 12 is in the open position, fastener 26 can be removed and the telco cover can be rotated to an open position. Fastener 26 is not easily removed by a subscriber because it requires a special tool. When the subscriber and telco covers are both in the open position, as shown in FIG. 4, the subscriber and telco compartments and the subscriber and telco portions of the modular devices 18 and 20 are visible.

Figure 2:
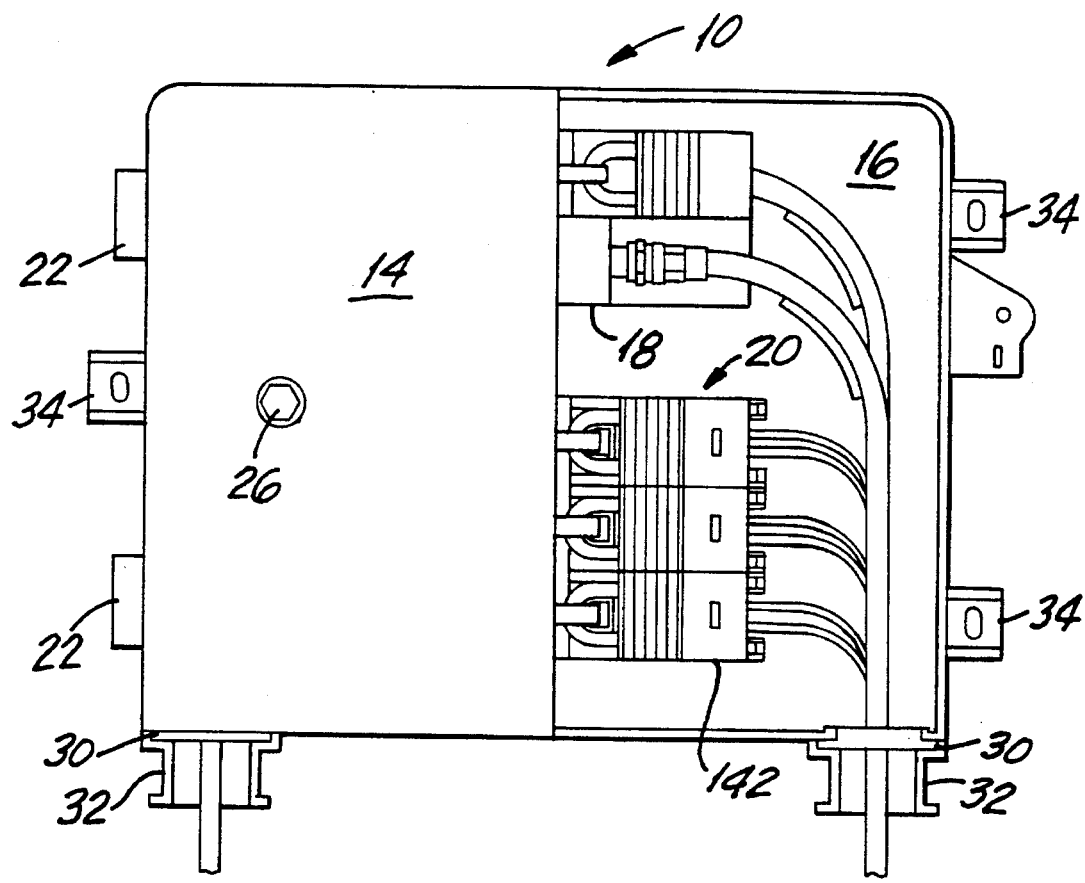
FIG. 2 is a top view of the telephone network interface apparatus of FIG. 1 with the subscriber cover in an open position such that the subscriber compartment and the subscriber portions of the modular devices are visible.
Figure 3:
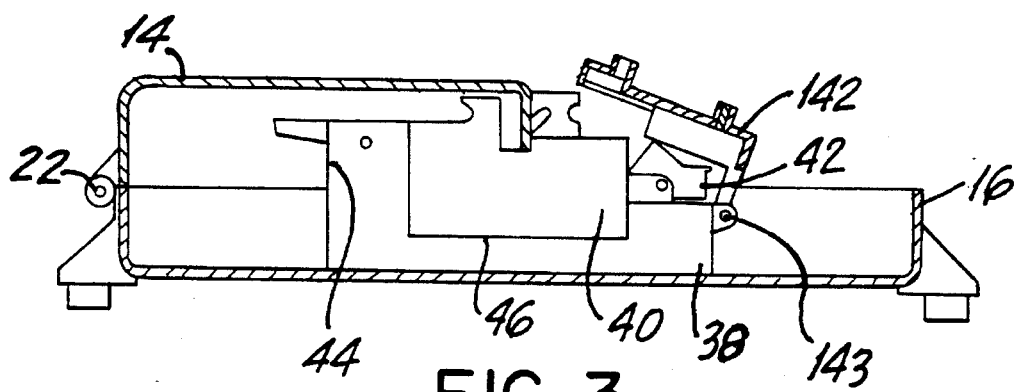
FIG. 3 is a side view of the telephone network interface apparatus of FIG. 1 with the subscriber cover in the open position such that the subscriber compartment and the subscriber portions of the modular devices are visible.
Figure 4:
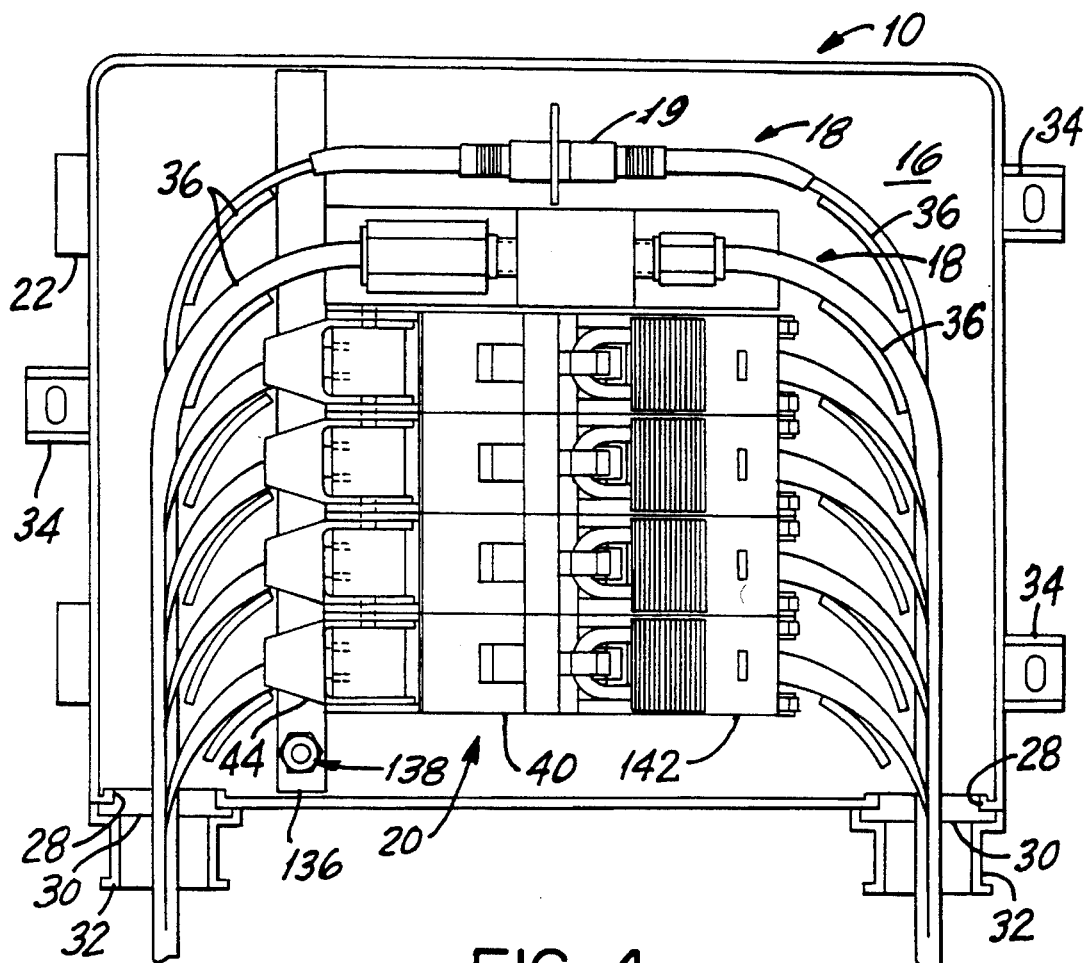
FIG. 4 is a top view of the telephone network interface apparatus of FIG. 1 with the subscriber and telco covers both in open positions such that the subscriber and telco compartments and the subscriber and telco portions of the modular devices are visible.

As shown in FIGS. 1, 2 and 4, the telephone network interface apparatus 10 has openings 28 for subscriber and telco wiring. The openings 28 may be provided with grommets 30 and covered with downwardly extending protective cover members 32 for covering the subscriber and telco wiring. As would be understood by a person skilled in the art, the telephone network interface apparatus may be provided with other means for weatherproofing, for example, sealed electrical connections and/or gels. Also, the telephone network interface apparatus 10 has mounting brackets 34 formed integrally with the base 16.

The telephone network interface apparatus 10 includes removably mounted modular devices 18 and 20. Modular devices 18 may be used to connect telco and subscriber wiring in the form of coaxial cable or fiber optic cable while modular devices 20 may be used to connect conventional insulated telco and subscriber wiring.

When the telephone network interface apparatus is used to connect coaxial cable or fiber optic cable, it is highly desirable to employ bend radius control. A bend radius control guide 36 is shown molded into the base 16 of the telephone network interface apparatus 10 to ensure that the bend radius of the cable is not less than about 1.5 inches. Other types of bend radius control devices such as brackets or clamps could also be employed. As shown in FIG. 4, coaxial cable or fiber optic cable may be directly connected at the telephone network interface apparatus using a "bulkhead-type" connection 19 or may be connected through modular device 18.

The telephone network interface apparatus shown in FIGS. 1, 2 and 4 is designed to contain up to six modular devices. As would be understood by a person of ordinary skill in the art, the telephone network interface apparatus may be designed to contain more or less than the six modular devices shown.

Figure 5:
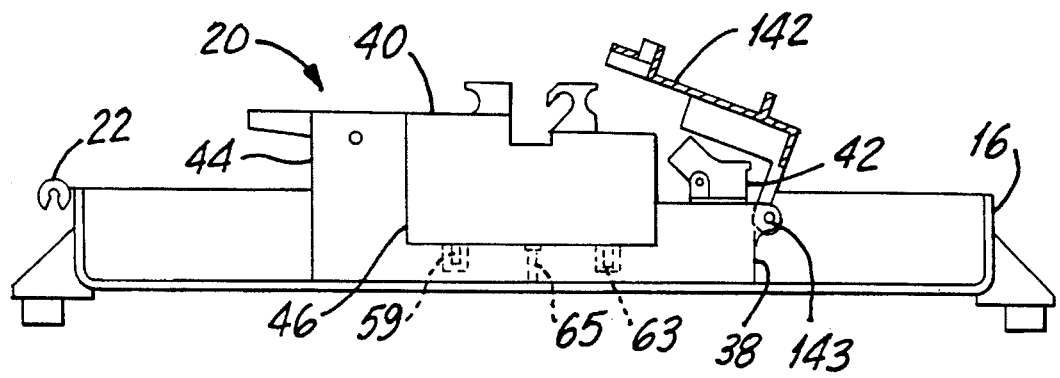
FIG. 5 is a side view of the telephone network interface apparatus with the subscriber and telco covers both in open positions such that the subscriber and telco compartments and the subscriber and telco portions of the modular devices are visible.
Figure 10:
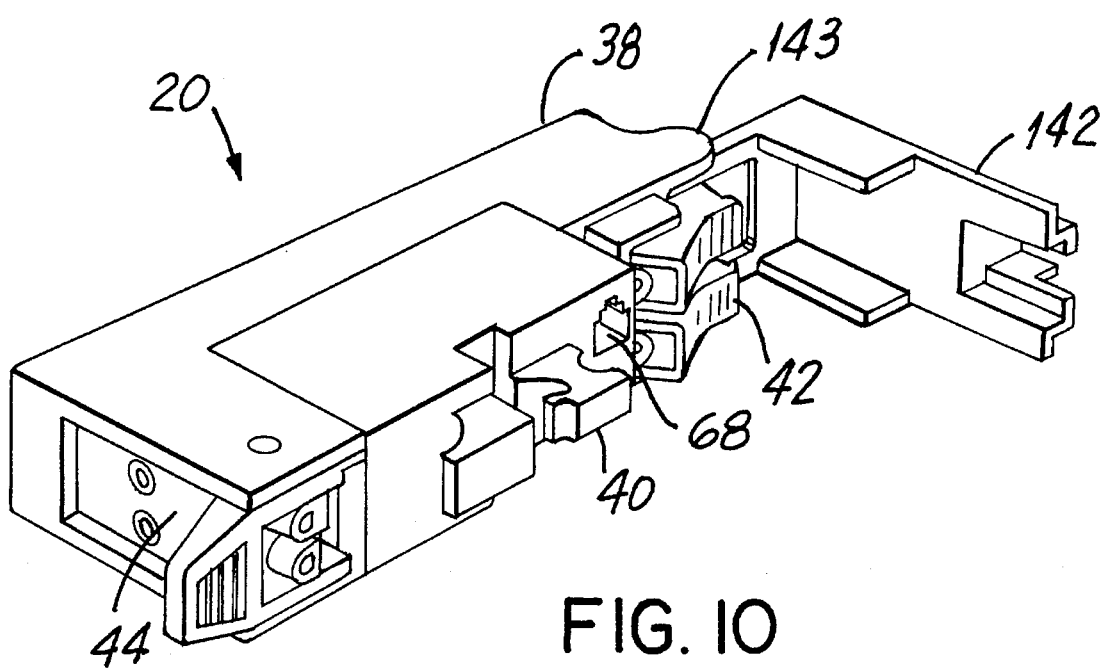
FIG. 10 is a perspective view of an embodiment of the modular device.

The general structure of a modular device 20 for connecting conventional insulated telco and subscriber wiring may be understood by reference to FIGS. 3–10 and by particular reference to FIGS. 5, 6 and 10. Device 20 includes a housing 38, a replaceable protection and/or electronics unit 40, a pair of rocker arm termination mechanisms 42 and a cam actuated termination mechanism 44. The housing 38 is generally rectangular and includes an opening 46 for receiving the replaceable protection and/or electronics unit 40. The pair of rocker arm termination mechanisms 42 and the cam actuated termination mechanism 44 are mounted on opposite ends of modular device 20. Termination mechanism 44, protection/electronics unit 40, and termination mechanism 42 are electrically connected through an electrically conductive path (not shown) within device 20.

Figure 11:
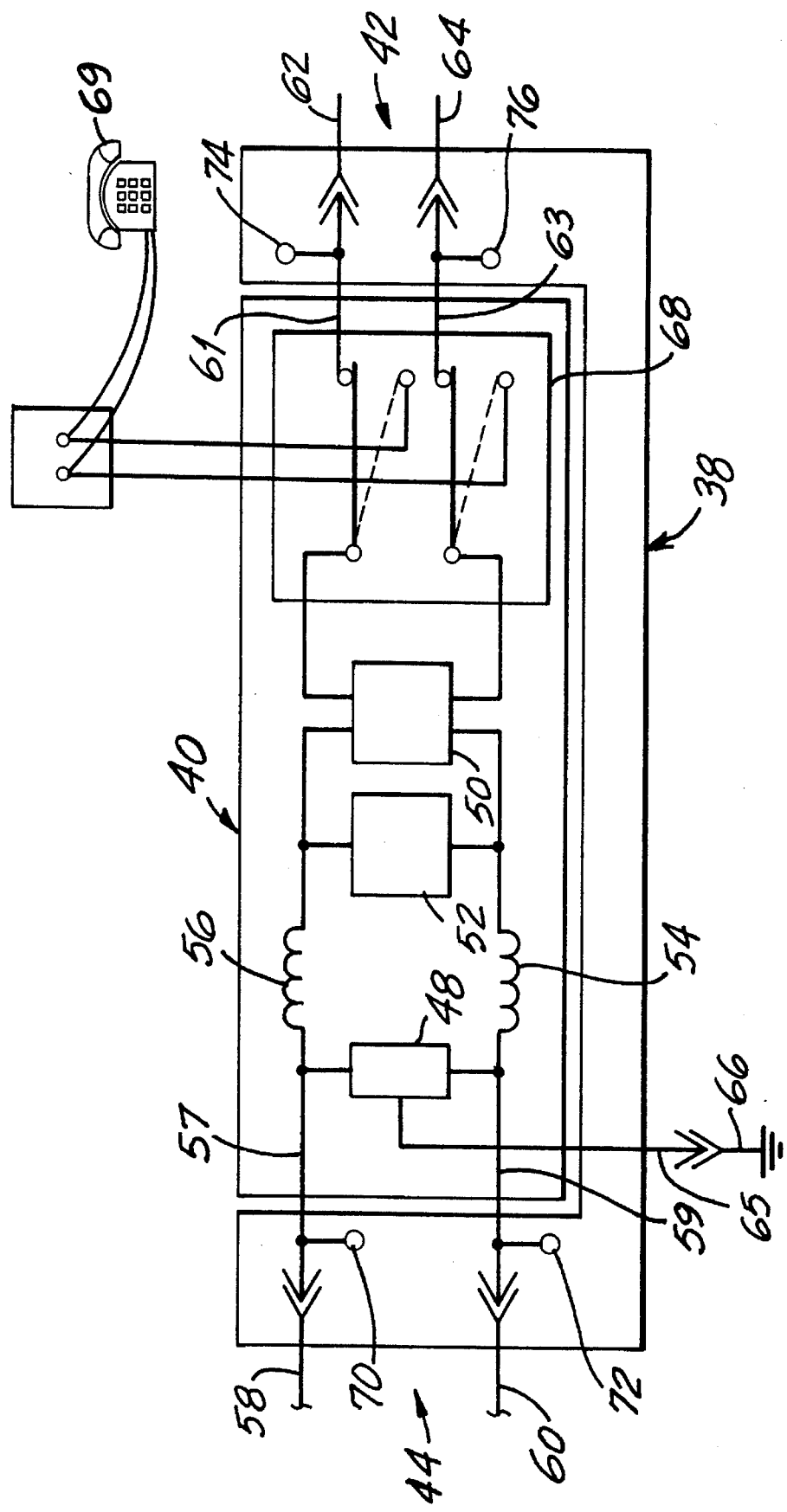
FIG. 11 is a schematic diagram of the modular device and the replaceable protection/electronics unit.
Figure 12:
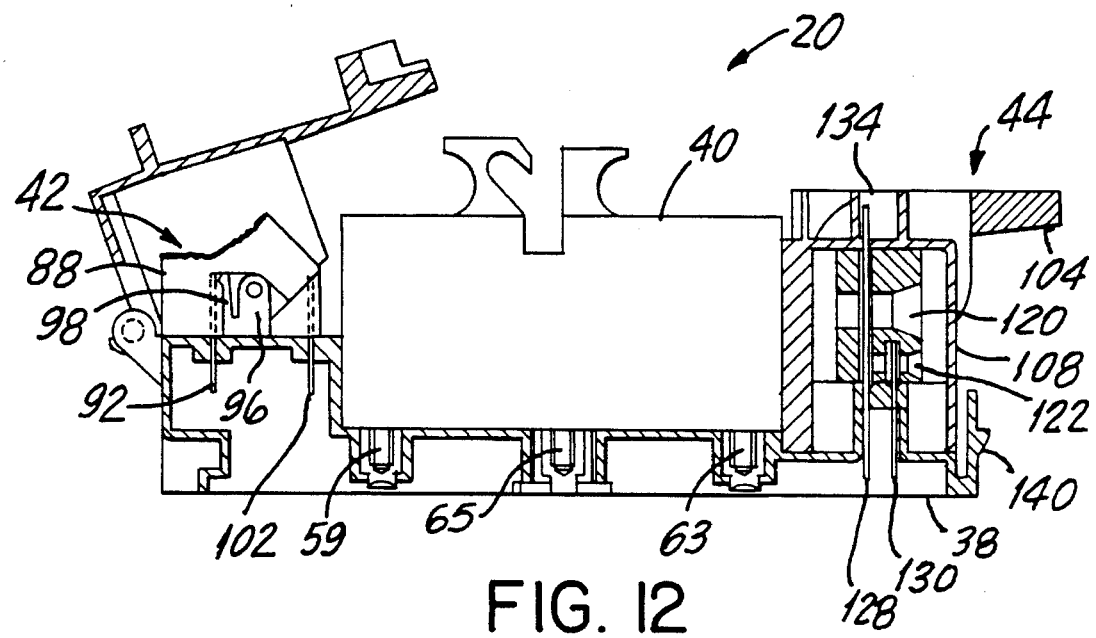
FIG. 12 is a side view of an embodiment of the modular device in a partial cross-section.
Figure 13:
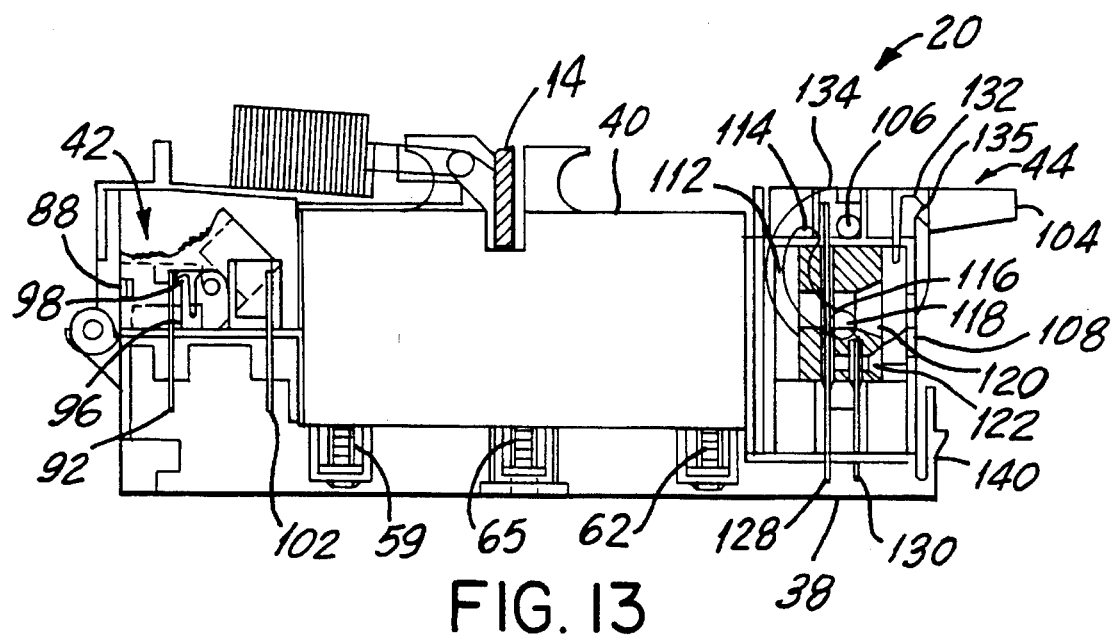
FIG. 13 is another side view of an embodiment of the modular device in partial cross-section.
Figure 14:
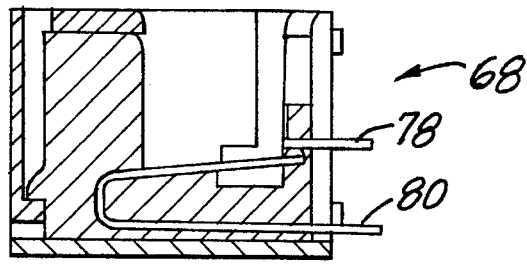
FIG. 14 is a cross-sectional view of the switchable RJ-11 type socket.
Figure 15:
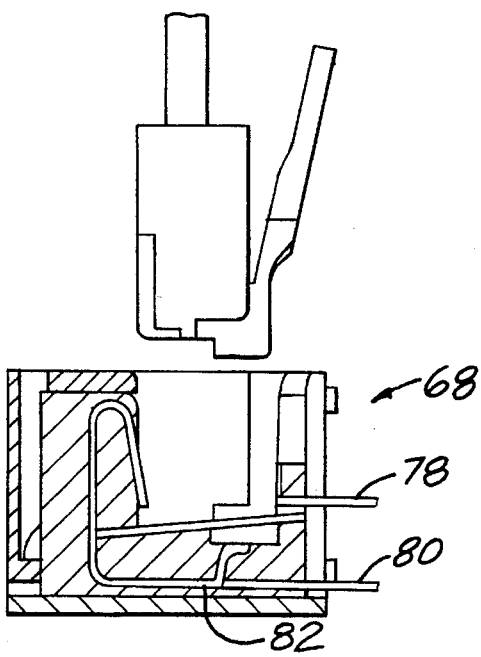
FIG. 15 is another cross-sectional view of the switchable RJ-11 type socket.
Figure 16:
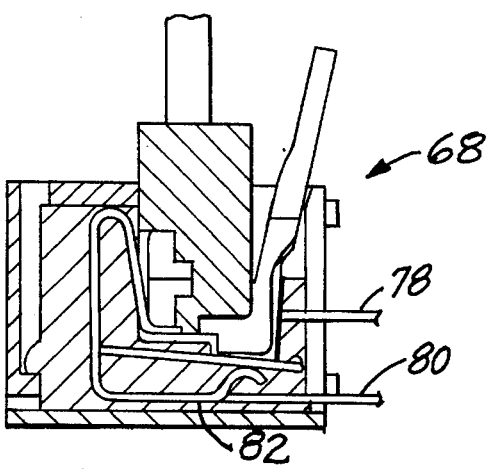
FIG. 16 is a cross-sectional view of the switchable RJ-11 type socket with an RJ-11 plug inserted therein.

As shown schematically in FIG. 11, the protection/electronics unit 40 may include an overvoltage protection device in the form of a gas tube 48, a maintenance termination unit 50 and a ringer simulator (half ringer) 52. It may also include a transient protection in the form of series inductances 54 and 56. The inductances should be sufficiently large to limit transients while, at the same time, not so large as to seriously limit the bandwidth of the communication link. Therefore, the inductances may be in the range of 50 to 200 microhenries and preferably in the range of 50 to 150 microhenries and more preferably in the range of 50 to 100 microhenries. As would be understood by a person of ordinary skill in the art, the content of the removable unit 40 is not limited and can accommodate additional electronic components. The removable protection/electronics unit 40 has five electrical contacts, as shown schematically in FIG. 11 and as shown in part in FIGS. 5, 6, 12 and 13 Contacts 57 and 59 are connected to the telco wires 58 and 60, contacts 61 and 63 are connected to the subscriber wires 62 and 64 and contact 65 is connected to ground 66.

The removable protection/electronics unit may also have a plug-actuated switchable RJ-11 type socket 68 that may be connected to a test phone 69 as shown schematically in FIG. 11 and as shown in FIGS. 9 and 10. As shown in FIGS. 14–18, the plug actuated switchable RJ-11 type socket 68 has a customer contact 78 connected to the subscriber wires, a telco contact 80 connected to the telco wires and a test contact 82 for connection to a plug. The test contact 82 does not lie in the same plane as the customer and telco contacts 78 and 80.

Figure 17:
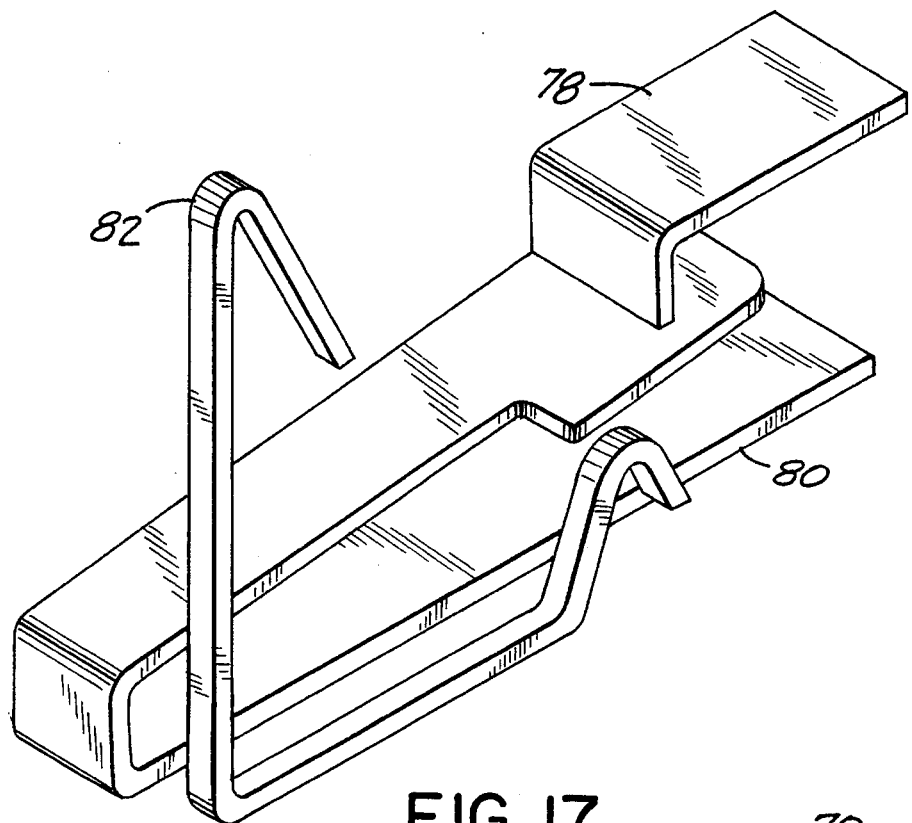
FIG. 17 is a perspective view of one set of contacts in the switchable RJ-11 type socket showing the connection of the telco and customer contacts.
Figure 18:
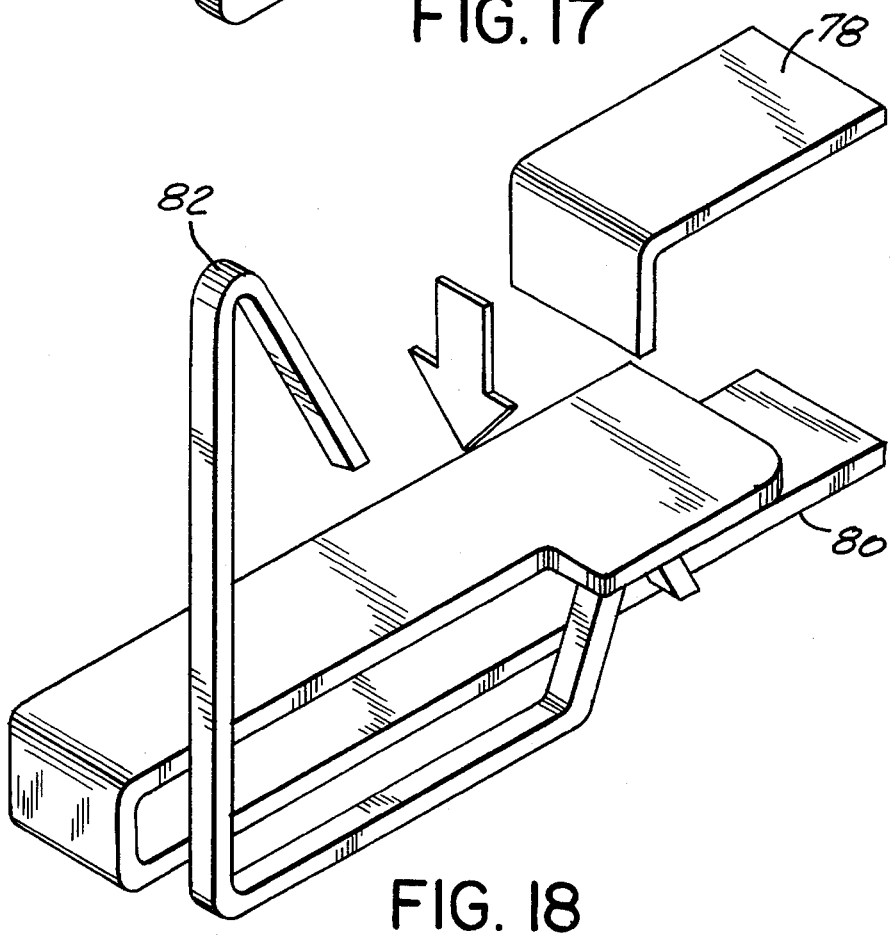
FIG. 18 is a perspective view of one set of contacts in the RJ-11 type switchable socket showing the connection of the telco and test contacts.

FIGS. 17 and 18 show the interaction of the customer, telco and test contacts. As would be understood by a person of ordinary skill in the art, FIGS. 17 and 18 show one set of customer, telco and test contacts. However, the switchable RJ-11 type socket actually has two sets of such contacts to accommodate the pair of telco and subscriber wires.

When the RJ-11 plug is not plugged into the switchable RJ-11 type socket 68, the telco contact 80, and thus the telco wires, are connected to the customer contact 78, and thus the subscriber wires, and the test contact 82 is out of the circuit. When the RJ-11 plug is inserted in socket 68 the customer contact 78, and thus the subscriber wires, are disconnected from the telco contact 80, and thus the telco wires, and the telco contact and telco wires are connected to the test contact 82 in socket 68 which mate with contacts in the RJ-11 test plug. Although shown as part of the replaceable protection/electronics module, the switchable RJ-11 type socket 68 could also be part of the module housing 38.

As shown schematically in FIG. 11, the module housing 38 has a pair of test points 70 and 72 connected to the telco wires and a pair of test points 74 and 76 connected to the subscriber wires.

Modular devices 20 as shown in FIGS. 3–5, 6 and 10 represent one embodiment of the invention. Devices 20 have one pair of rocker arm wire termination mechanisms 42 and a replaceable protection/electronics unit 40. As would be understood by a person of ordinary skill in the art, the modular device 20 could have two pairs of rocker arm wire termination mechanisms 42 and a replaceable protection/electronics unit 40 because some telephone companies use four wire arrangements. Two pair of rocker arm wire terminations 42 would permit connecting four pairs of subscriber wires to the modular device 20.

Referring now to FIGS. 12, 13 and 19–24, there is disclosed details of the rocker arm wire termination mechanism 42. Each rocker arm includes two legs 82 and 84 and a pivot 86 between legs 82 and 84. The pair of rocker arm terminations 42 are mounted to housing 38 of device 20 at the pivot 86 such that one leg 84 of each rocker arm faces to the front of the device and the other leg 82 of each rocker arm faces to the rear of the device. Leg 84 has two openings, 88, and a cavity 90 which is generally perpendicular to and communicates with openings 88. Openings 88 are adapted to receive subscriber wires 92. As would be understood by a person of ordinary skill in the art, some subscriber premises are wired so that each phone has separate wires connected directly to the modular device. Two openings 88 are provided on each rocker 42 to permit connecting two subscriber wires in such situations. Cavity 90 in leg 84 is adapted to receive an insulation displacement contact 92 mounted on housing 38. The modular device 20 housing 38 has projections 96. The pair of rocker arm terminations 42 are mounted on the projections 96 by pivot point 86 such that when the rocker arm is pivoted about point 86 the cavity 90 in each rocker arm is forced down over insulation displacement contact 92 which is mounted on device 20. Each insulation displacement contact 92 has a slot which is adapted to receive an insulated wire. Contact 92 is connected to an electrical conductor 94 within housing 38. The electrical conductor 94 is also connected to a test point 102.

Figure 19:
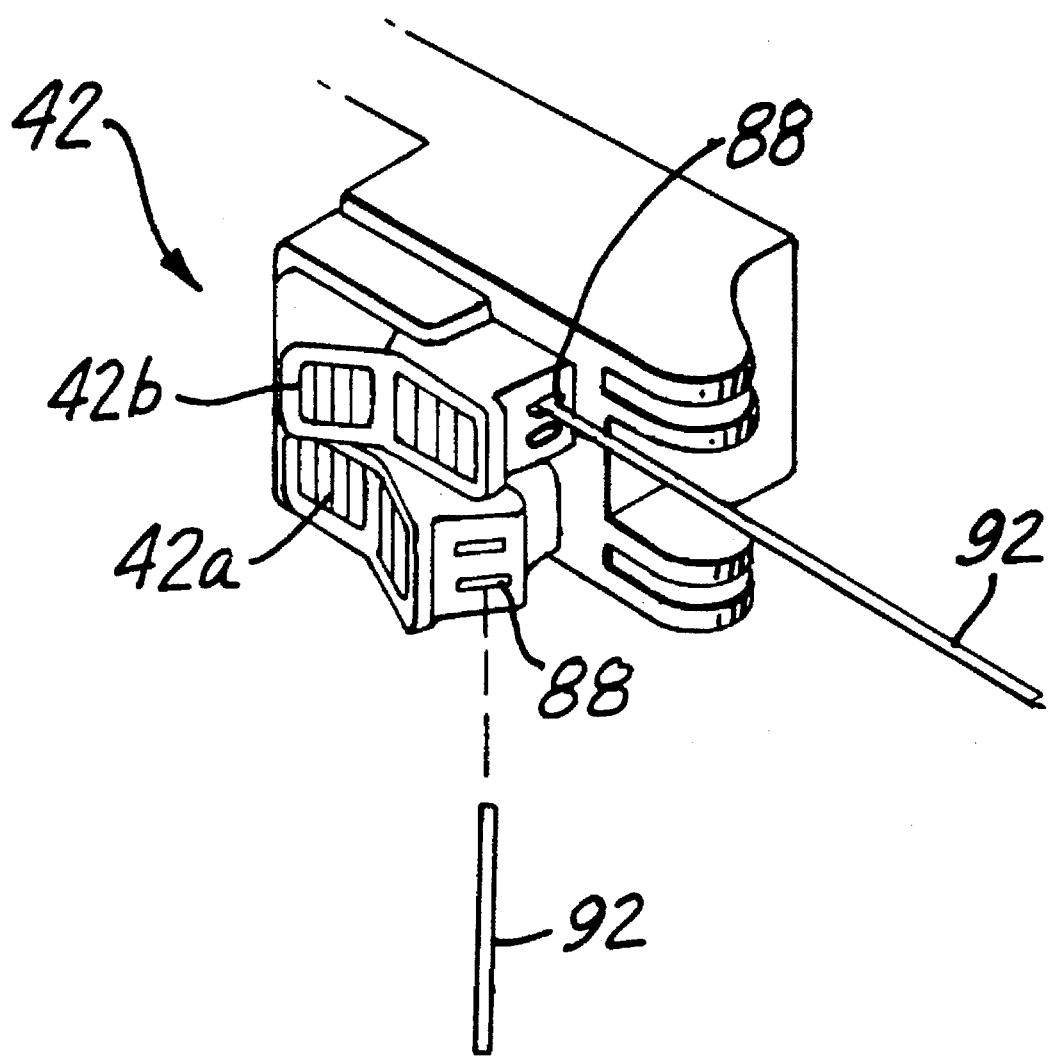
FIGS. 19 is a perspective view of a rocker arm wire termination mechanism.
Figure 20:
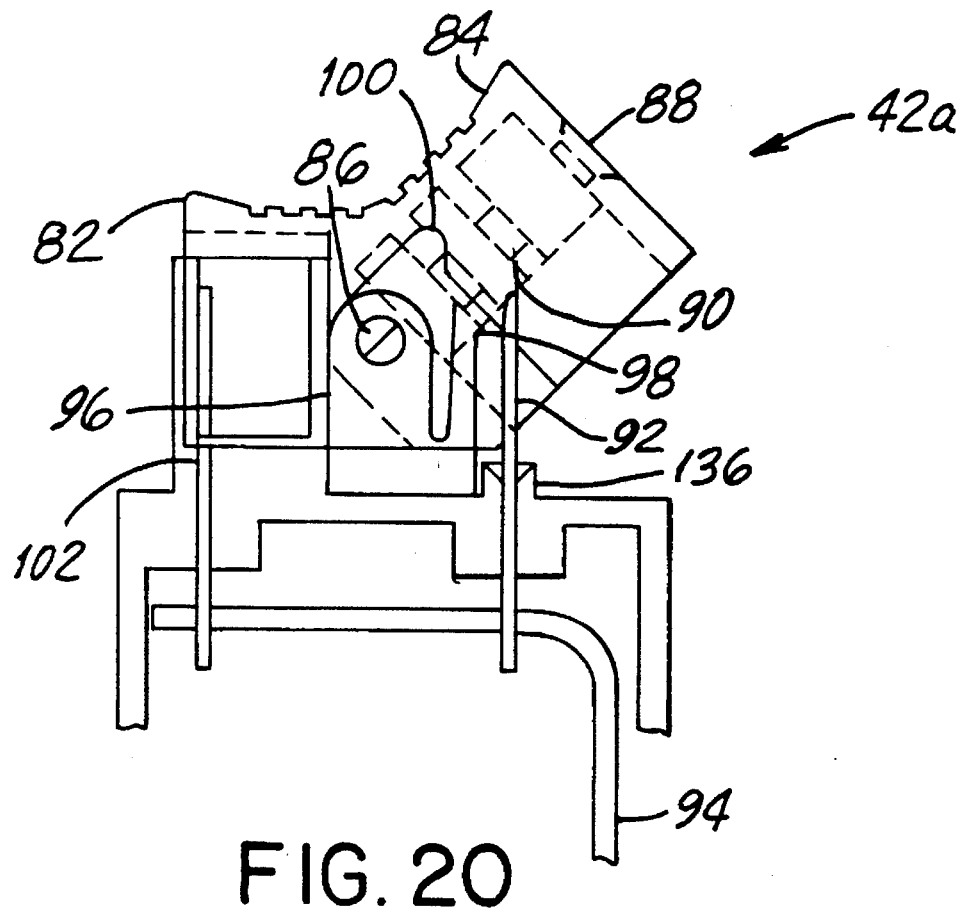
FIG. 20 is a side view of the rocker arm termination mechanism showing the rocker arm termination mechanism in the open position.
Figure 21:
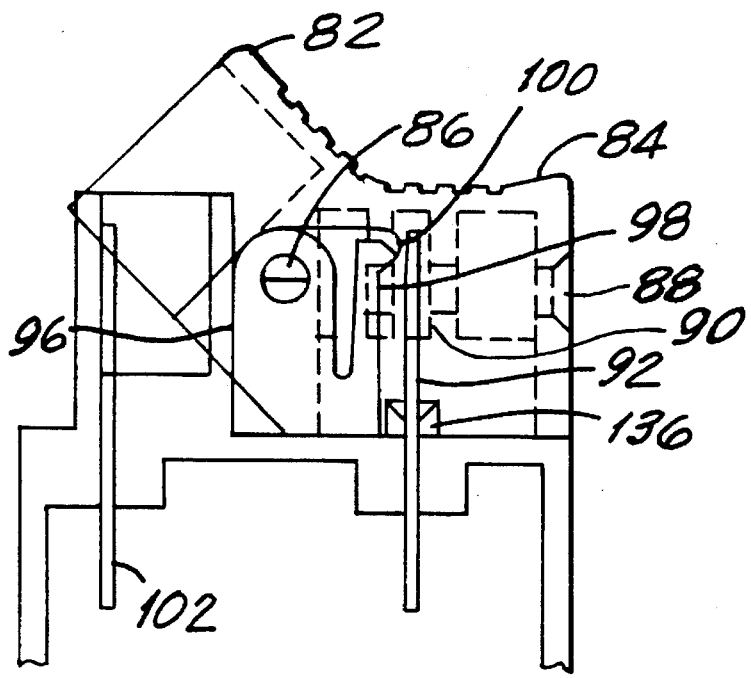
FIG. 21 is a side view of the rocker arm termination mechanism showing the rocker arm termination mechanism in the closed position.
Figure 22:
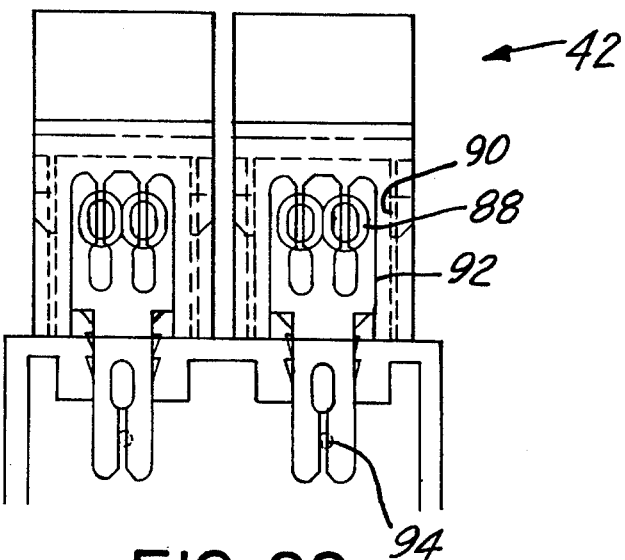
FIG. 22 is a front view of the rocker arm termination mechanism.
Figure 23:
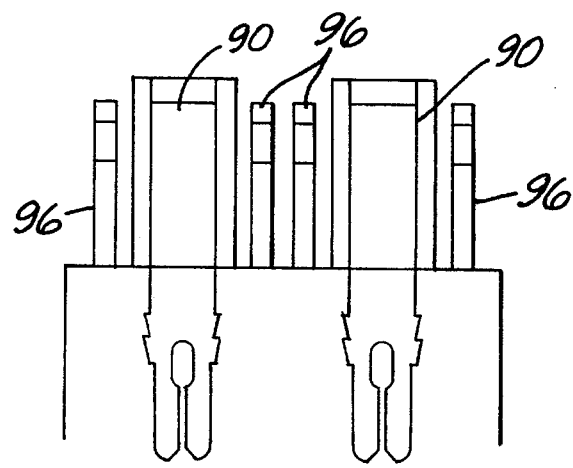
FIG. 23 is a front view of a portion of the modular device showing hardware for mounting the rocker arm termination mechanism.
Figure 24:
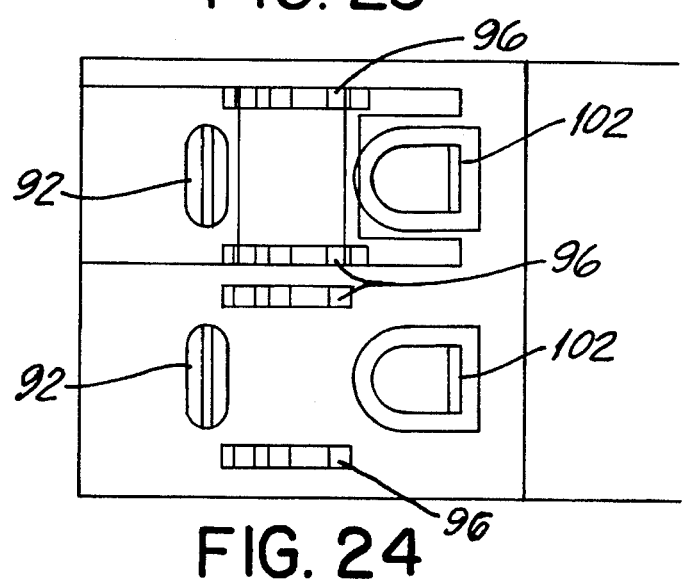
FIG. 24 is a top view of a portion of the modular device showing hardware for mounting the rocker arm termination mechanism.
Figure 25:
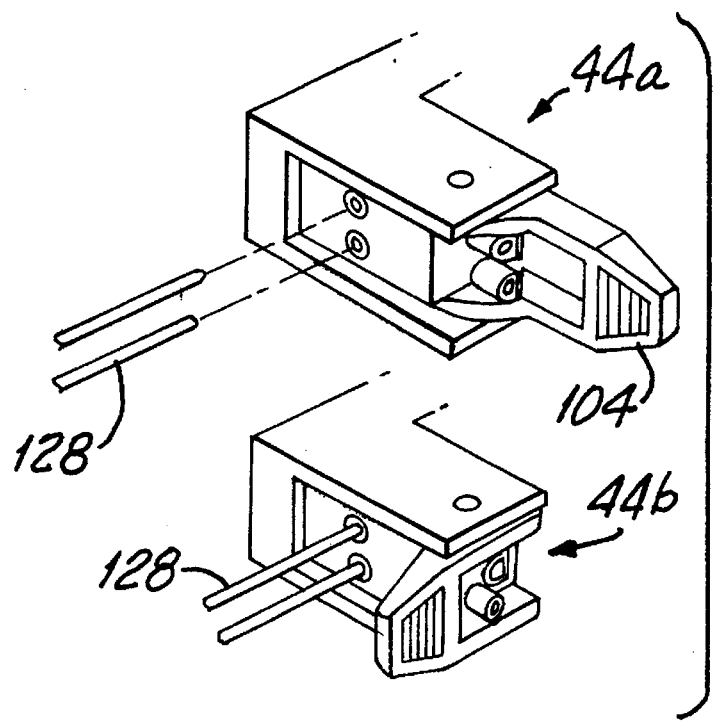
FIG. 25 is two perspective views of a cam actuated wire termination mechanism.
Figure 26:
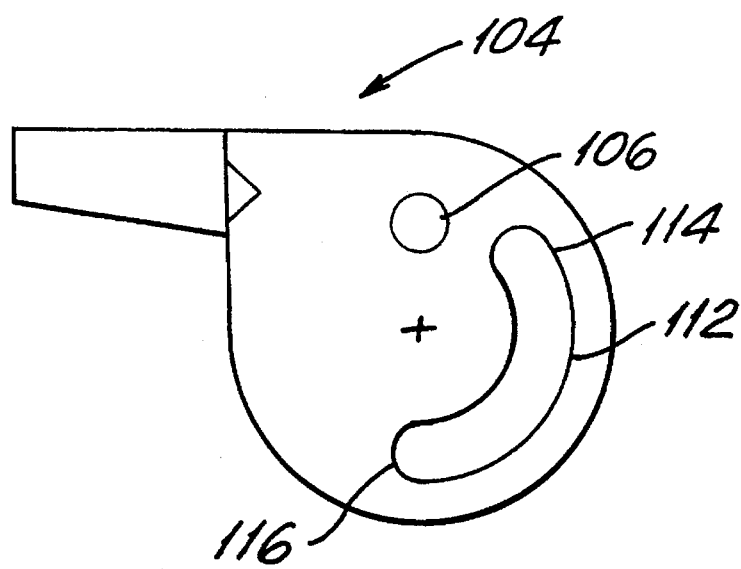
FIG. 26 is a side view of a lever for use in the cam actuated wire termination mechanism.

In use, the rocker arm terminations 42 connect subscriber lines 92 to device 20 using a minimal amount of force and without the need for tools. Rocker arm termination 42a is shown in FIGS. 19 and 20 in an open, disconnected position. A peg 98 extends from projection 96. Rocker arm termination 42 is held in an open position by the peg 98. When subscriber wire 92 is inserted into opening 88 and pressure is applied to leg 84, peg 98 is released, the rocker arm 42 rotates, subscriber wire 92 is driven into the slot in insulation displacement contact 92 and contact 92 is forced into cavity 90. Rocker arm termination 42b in FIGS. 19 and 21 is shown in a closed, connected position such that the subscriber line 92 is connected to the modular device 20. Peg 98 engages a notch 100 to hold rocker arm termination 42 in the closed position. In this position, a telco employee can test the circuit without disturbing the subscriber line connection by touching test point 102 with an electrical test probe.

Referring now to FIGS. 12, 13 and 25–34, there is disclosed a cam actuated wire termination mechanism 44 which includes a lever 104, a pivot point 106, and a main body 108. The housing 38 is provided with projections 110. Lever 104 is mounted to housing 38 of device 20 at the projection 110 by pivot point 106. The lever 104 includes an arcurate-shaped slot 112 having two ends 114 and 116. The distance from slot 112 to pivot point 106 is less at the first end 114 of slot 112 than at the second end 116 of slot 112. The main body 108 of termination mechanism 44 includes a pin 118 which fits in slot 112 of lever 104. Rotating lever 104 causes main body 108 to translate up and down in a vertical direction.

The main body 108 also includes openings 120 and 122 and cavities 124 and 126 which are perpendicular to and communicate with openings 120 and 122. Openings 120 and 122 are adapted to receive wires 128 of different sizes. As would be understood by a person of ordinary skill in the art, telephone companies have traditionally used larger gauge wire but more recently have begun to use smaller gauge wire. Openings 120 and 122 are designed to accommodate both sizes of telco wiring. Cavities 124 and 126 are adapted to receive an insulation displacement contacts 128 and 130 which are mounted on housing 38 of device 20. When lever 104 is rotated counterclockwise, the main body 108 is driven downward and insulation displacement contacts 128 and 130 are driven into cavities 124 and 126 respectively.

In use, the cam actuated wire termination mechanism 44 connects telco wires to modular device 20 using a minimal amount of force and without the need for tools. As shown in FIGS. 25 and 31–34, termination mechanism 44a is in an open, disconnected position. Telco wires 128 are inserted into openings 120 and pressure is applied to lever 104 in the direction of force F. The force on lever 104 causes the lever 104 to rotate about the pivot point 106 which in turn causes pin 118 to ride in slot 112 from position 114 to position 116. Because the distance between the pivot point 106 and the slot 112 is less at the first end of the slot 114 than at the second end of the slot 116, the force causes the main body 108 downward and forces wires 128 into slots in insulation displacement contact 128. Termination mechanism 44b is in the closed, connected position such that the telco lines 128 are connected to the modular device 20.

The projection 110 upon which the cam actuated wire termination mechanism is mounted to modular device housing 33 is provided with a peg 132. In the closed position, peg 132 engages knob 135 to secure the lever 104. Test point 134 is provided so that the telco wire may be contacted by a test probe even when the cam actuated wire termination mechanism is in the closed position.

As shown in FIG. 5, modular device 20 is mounted to base 16 of the telephone network interface apparatus 10. Device 20 has a projection 140 (FIG. 12 and 13) that engages a corresponding notch on the base 16 to secure modular device 20 to the base 16. Base 16 has a buss 136 that runs the length of the telephone network interface apparatus 10 and that electrically connects ground terminal 66 on the replaceable protection/electronics units 40 of the devices 20 with a bolt 138 that is grounded.

To address environmental concerns, the removable protection/electronics units contacts 57, 59, 61, 63 and 65, the test points 70, 72, 74 and 76, the insulation displacement contacts 92, 128 and 120, the buss 136 may be encased in gels of the type disclosed in U.S. Pat. No. 5,273,449 issued to Raychem Corporation. In addition, the insulation displacement contacts 92, 128 and 130 of the rocker arm and cam activated terminations 42 and 44 are mounted to the housing 38 of the modular device 20 at pedestals 136 and 138. Pedestals 136 and 138 prevent water that may get through the gel from seeping into the housing 38.

As shown in FIG. 2, when the subscriber cover is open, subscribers can access the subscriber portion of the modular device 20. However, subscribers may choose to protect their telephone lines from persons seeking illicit access. The subscriber portion of the modular devices 20 are covered by individual subscriber security covers 142 which are secured by padlocks. Security covers 142 limit access to the subscriber portion of devices 20. When the padlock is removed as shown in FIGS. 3, 5, 6 and 10, the individual subscriber security covers hinge open at hinge 143 and the rocker arm terminations 42 are readily accessible.

Figure 34:
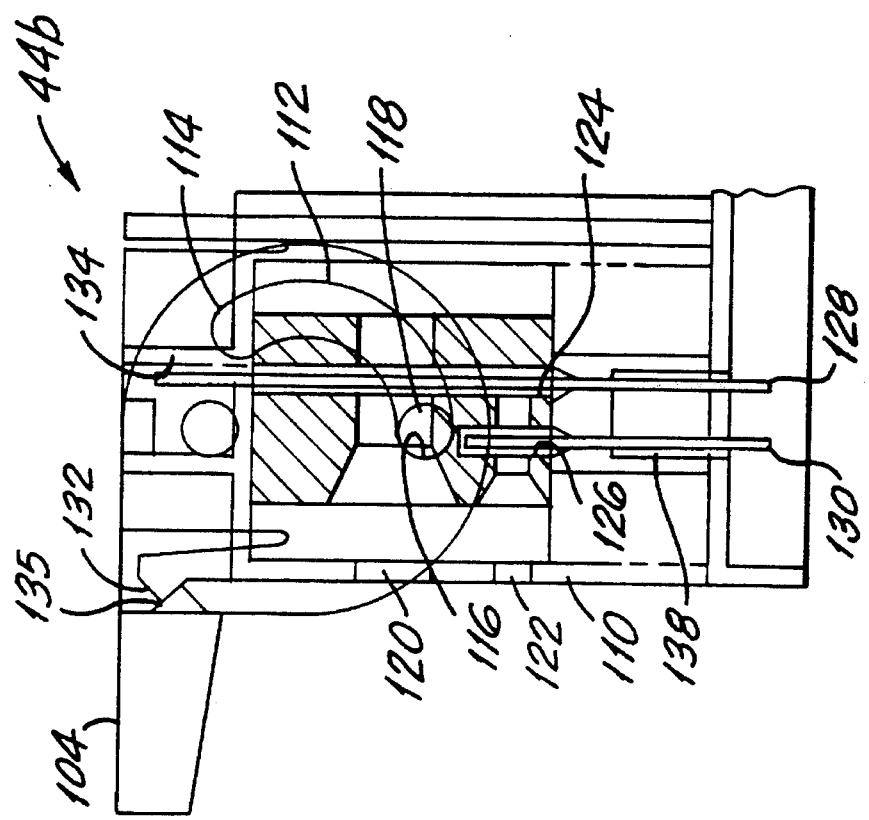
Figure 33:
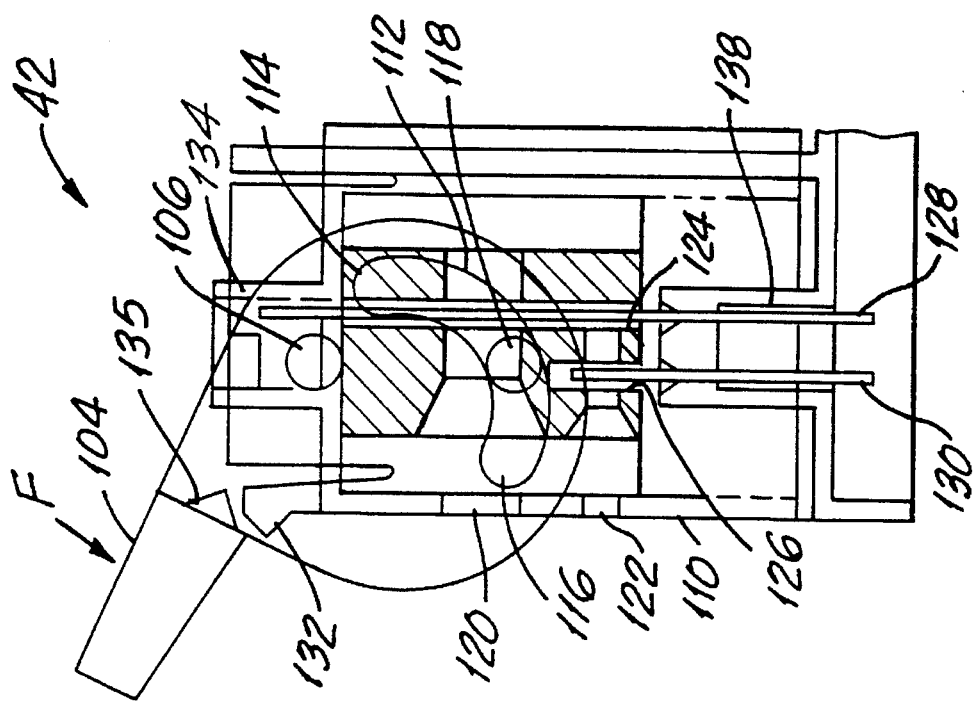
Figure 35:
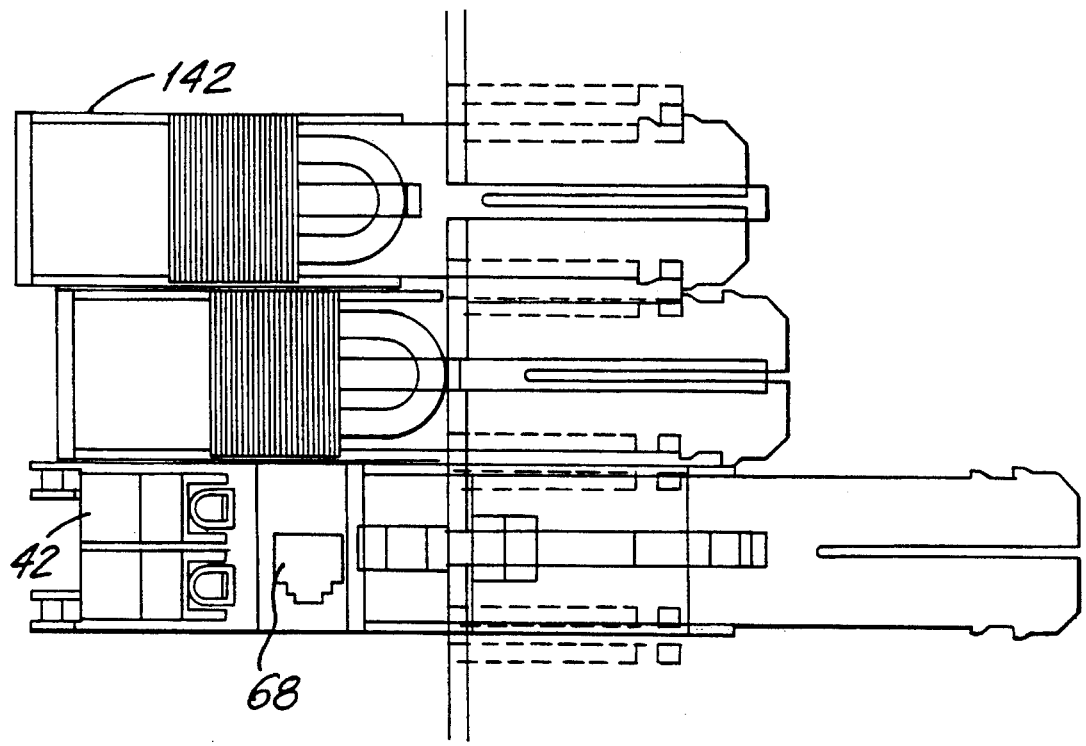
FIG. 35 is a top view of an individual security cover for the modular device.
Figure 36:
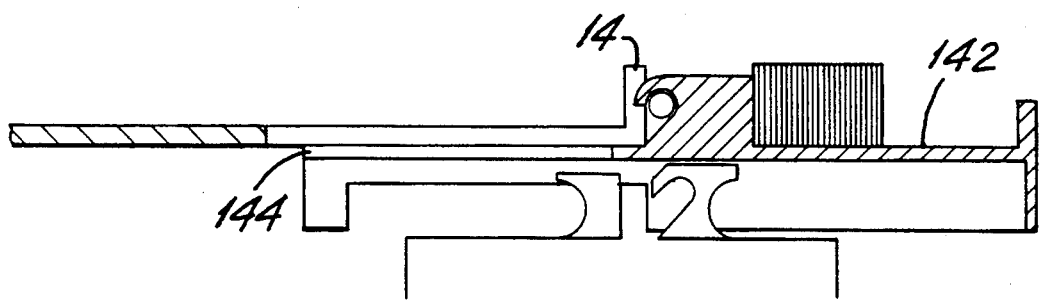
FIG. 36 is a side view of the individual security cover for the modular device.
Figure 37:
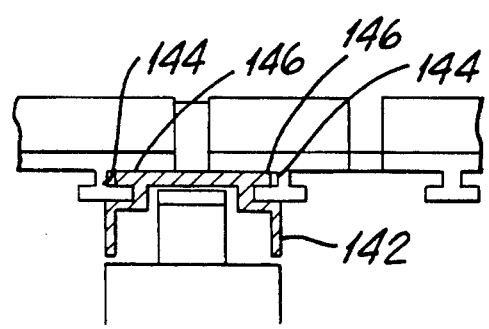
FIG. 37 is a front view of the individual security cover for the modular device.
Figure 38:
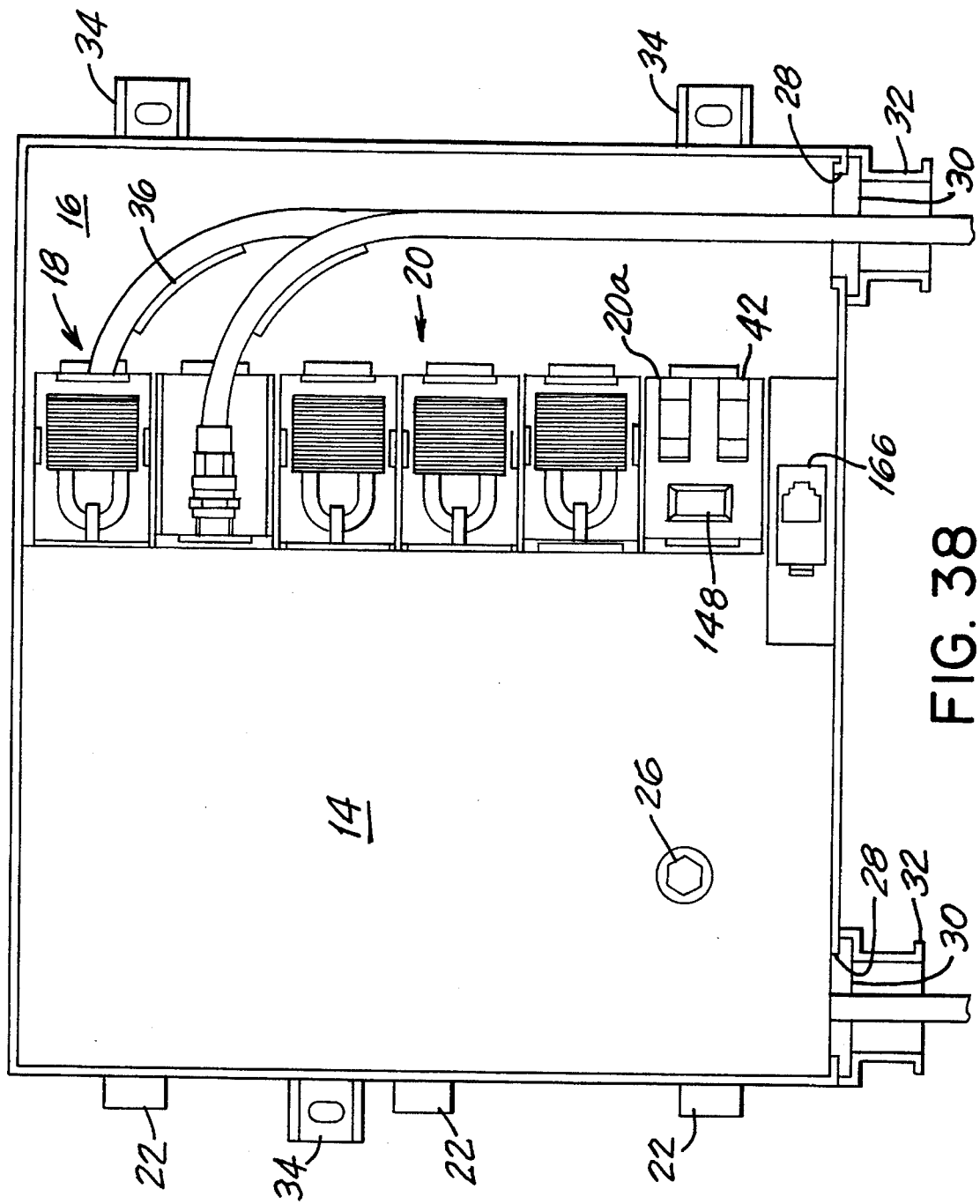
FIG. 38 is a top view of another embodiment of the telephone network interface apparatus with the subscriber cover in an open position such that the subscriber compartment and the subscriber portions of the modular devices are visible.

Alternately, the security cover 142 can slide to expose the subscriber portion of the modular device 20. As shown in FIGS. 35–37, the telco cover can be provided with channels 144 and the security cover 142 with projections 146 that ride in channels 144 such that the security cover can slide back and forth. Alternatively, as can be understood by reference to FIGS. 40–42, the individual security cover can wrap around the modular device and can be provided with projections that slide in channels in the modular device (not shown). As shown in FIGS. 31, 32 and 34, when the telco cover 14 is closed, security covers 142 and the padlocks rest against the edge of the telco cover 14 and cannot slide. When the padlock is removed, the individual security cover 142 can slide in channels 144 to expose the subscriber portions of modular device 20. The cover 142 does not, however, slide so far as to give the subscriber access to the replaceable unit 40.

Figure 39:
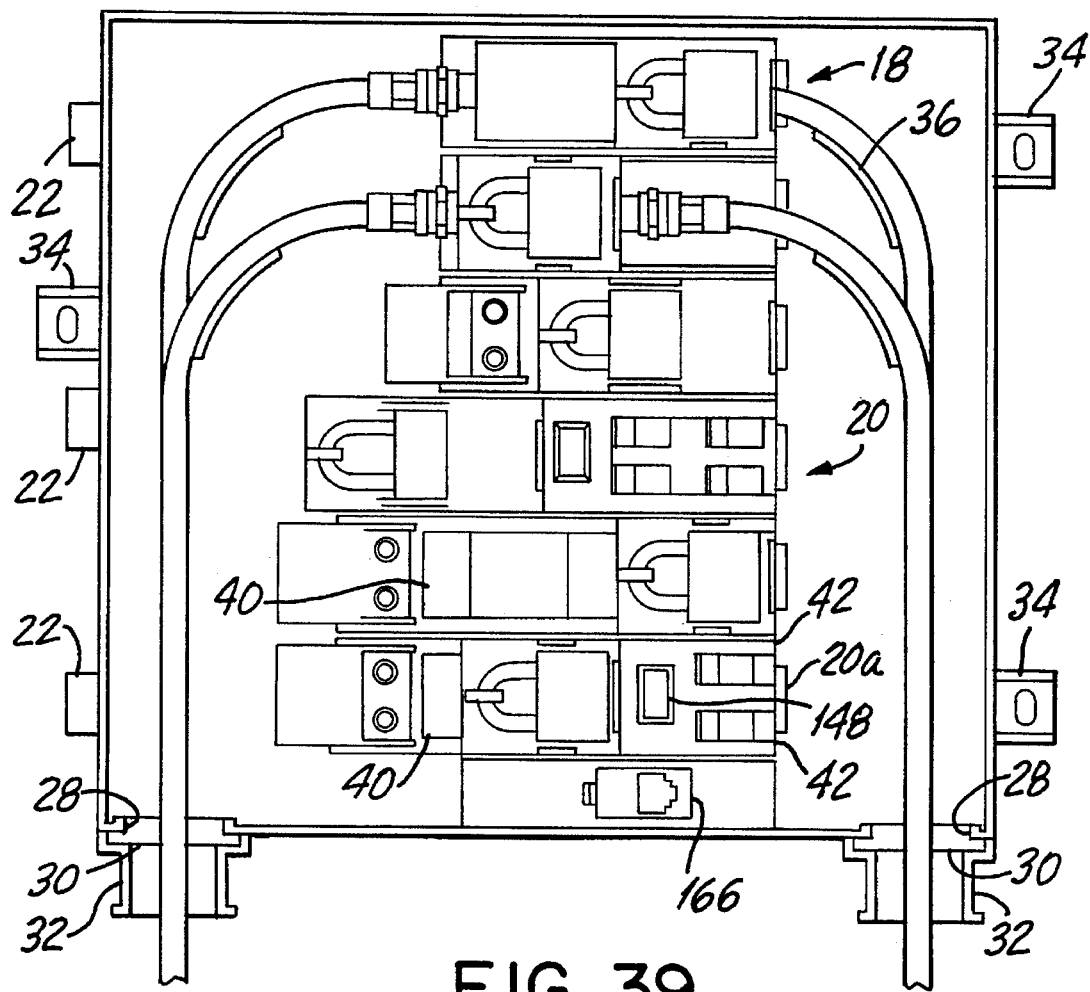
FIG. 39 is a top view of another embodiment of the telephone network interface apparatus with the subscriber and telco covers both in open positions such that the subscriber and telco compartments and the subscriber and telco portions of the modular devices are visible.

The individual subscriber security covers 142 do not prevent the telephone company from accessing the subscriber portions of devices 20. As can be understood from FIGS. 4 and 5, when the telco cover is open, the padlock no longer abuts the telco cover and can be removed so that the individual security cover 142 can be hinged open. In the case of the sliding individual security covers 142 that ride in channels on the telco cover, the sliding individual security cover will open with the telco cover because the individual security cover stays in channels 144 when the telco cover is opened as can be understood from FIGS. 36 and 37. In the case of the sliding individual security covers 142 that ride in channels on the modular device, when the telco cover is open, the security cover no longer abuts the telco cover and can slide open as shown in FIG. 39.

An alternative embodiment of the modular device 20, may be understood by reference to FIGS. 38–42. Device 20 includes a switch 148 that electrically connects the telco wiring to a RJ-11 type socket 166 mounted on the base 16 of the telephone network interface apparatus 10.

Figure 40:
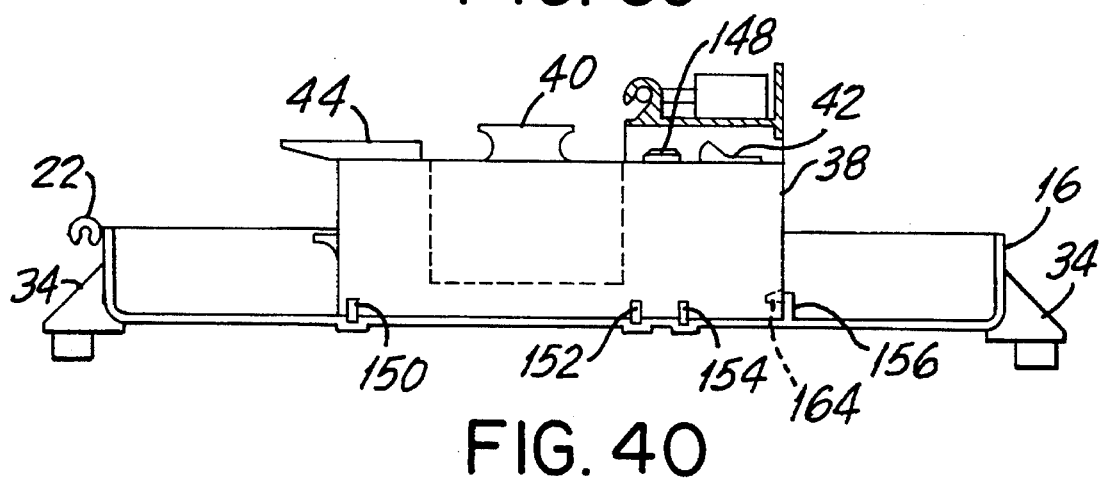
FIG. 40 is a side view of another embodiment of the telephone network interface apparatus with the subscriber and telco covers both in open positions such that the subscriber and telco compartments and the subscriber and telco portions of the modular devices are visible.
Figure 41:
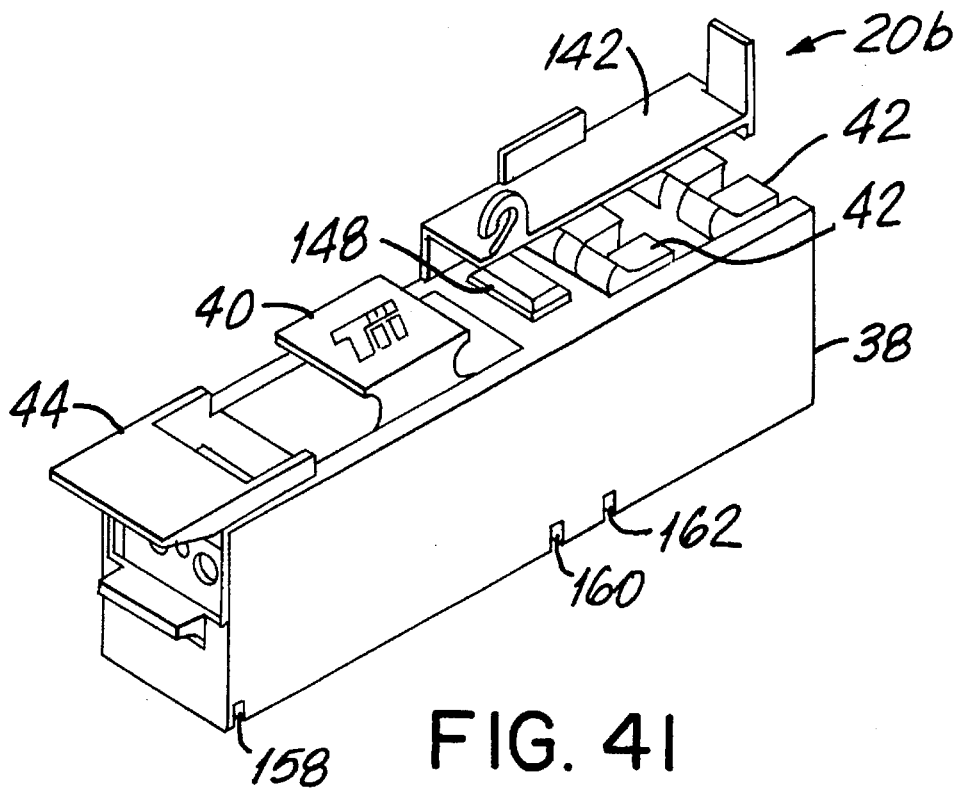
FIG. 41 is a perspective view of another embodiment of the modular device.
Figure 42:
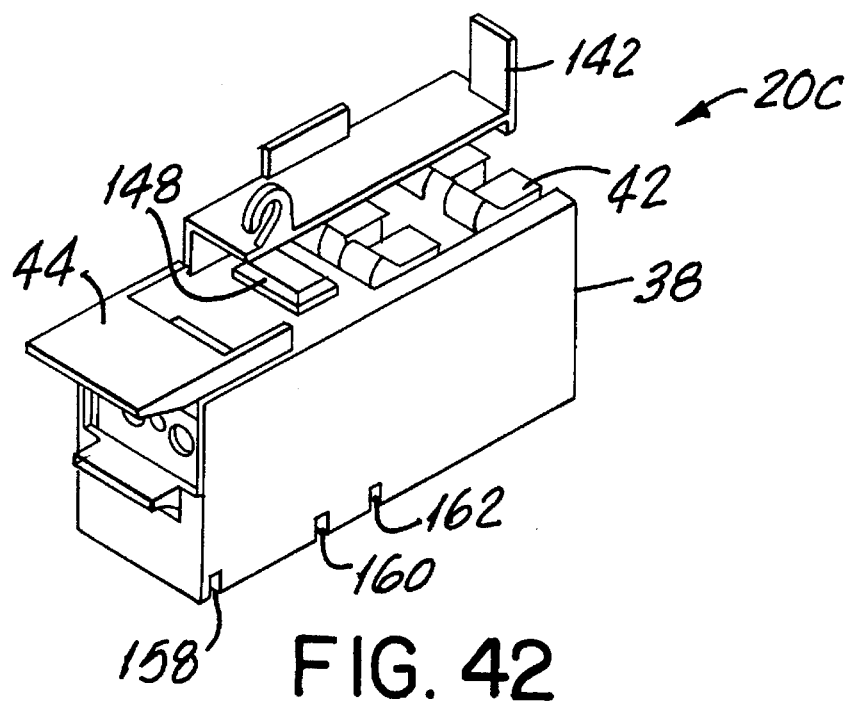
FIG. 42 is a perspective view of another embodiment of the modular device.

Modular device 20a as shown in FIG. 40 represent one embodiment of this alternative embodiment of the invention. Device 20a have one pair of rocker arm wire termination mechanisms 42 and a replaceable protection/electronics unit 40. Modular device 20b as shown in FIG. 41 represents another embodiment of the alternative embodiment of the invention. Device 20b has two pairs of rocker arm wire termination mechanisms 42 and a replaceable protection/electronics unit 40. The two pair of rocker arm wire terminations 27 permit connecting four pairs of subscriber wires to device 20b. Modular device 20c as shown in FIG. 42 represents still another embodiment of the invention. Device 20c has two pairs of rocker arm terminations 42 and built-in protection and/or electronics (not shown). As would be understood by a person of ordinary skill in the art, another alternative embodiment of the invention could have one pair of rocker arm terminations 42 and built-in protection and/or electronics.

As shown in FIGS. 40–42, modular devices 20 are mounted to base 16 of the telephone network interface apparatus 10. Base 16 has busses 150, 152 and 154 and an upwardly extending inverted L-shaped member 156. Device 20 has notches 150, 160 and 162 having electrical contacts (not shown) to receive and make an electrical connection with the busses 150, 152, 154. Device 20 also has a notch 164 which receives the L-shaped member 156. The device 20 is secured to the base 16 by the interaction of the busses 150, 152 and 154 and the buss receiving notches 158, 160, 162, as well as the L-shaped projection 156 and notch 164.

The busses 150, 152 and 154 on base 16 run the length of the telephone network interface apparatus 10 and connect with a conventional RJ-11 telephone socket 166. Rocker arm termination 42, replaceable protection/electronics unit 40, switch 148 and cam actuated termination 44 are all electrically connected through an electrically conductive path (not shown) within housing 38 of device 20. Switch 148 is also electrically connected to busses 150, 152, 154. Switch 148 creates a point of demarcation between the subscriber wiring and the telco wiring by disconnecting the subscriber lines from the telco lines and by connecting the telco lines to the busses 150, 152 and 154, which are in turn connected to the socket 166. Thus, the subscriber may test his line by plugging his telephone into socket 166 and actuating switch 148 (which may be a "push-to-test" type switch) and determine if problems exist in his line or in the telco equipment.

While the present invention has been described by reference to various preferred embodiments, it will be understood by persons skilled in the art that many modifications and variations may be made in those preferred embodiments without departing from the spirit and scope of the present invention. Accordingly, it is intended that the invention not be limited to the disclosed preferred embodiments, but that it have the full scope permitted by the following claims.

What is claimed is:

1. A modular device adapted to be mounted in an enclosure with a plurality of similar devices and suitable for use in a telephone network interface apparatus for connecting at least one subscriber line and at least one telephone company line, each line comprising at least two wires, the modular device comprising:

(a) a housing;

(b) a first line termination device mounted on the housing for terminating the telephone company line, the line termination device comprising at least two insulation displacement contacts;

(c) a second line termination device mounted on the housing for terminating the subscriber line, the line termination device including at least two insulation displacement contacts; and (d) a socket having an electrical switch, the switch having two sets of first, second and third contacts, the first contacts of both sets for being connected to the telephone company line, the second contacts of both sets for being connected to the subscriber line, the first and second contacts of each set being normally connected in the absence of a plug being inserted in the socket, thereby connecting the telephone company and subscriber lines, the first contacts of both sets being disconnected from the second contacts of both sets and being connected to the third contacts of both sets when a plug is inserted in the socket, thereby disconnecting the telephone company line from the subscriber line and connecting the telephone company line to the third contacts of both sets which in turn connect with contacts in the plug and provide a demarcation point between the telephone company and subscriber lines.

2. The modular device of claim 1 further comprising a maintenance termination unit connected to said first line termination device.

3. The modular device of claim 1 further comprising a half ringer connected to said first line termination device.

4. The modular device according to claim 1 wherein at least one of the line termination devices comprises:

(a) at least one rocker arm with a pivot for mounting the rocker arm to the housing;

(b) an opening in the rocker arm for receiving an insulated wire inserted in the opening; and (c) a cavity in the rocker arm adapted to receive at least one insulation displacement contact when the rocker arm is rotated to force the wire into engagement with the insulation displacement contact and the insulation displacement contact into the cavity.

5. The modular device according to claim 1 wherein at least one of the line termination devices comprises:

(a) a lever with a curved slot and a pivot point for mounting the lever to the housing;

(b) a main body having an opening for receiving an insulated wire inserted in the opening;

(c) a pin mounted to the housing and adapted to fit in the slot of the lever; and (d) a cavity in the main body adapted to receive an insulation displacement contact, rotational movement of the lever about the pivot point causing translational movement of the body, thereby forcing the wire into engagement with the insulation displacement contact and the insulation displacement contact into the cavity.

6. The modular device according to claim 5 wherein the distance between the pivot point and the slot varies between one end of the slot and the other end of the slot as the lever is rotated about the pivot point.

7. The modular device according to claim 1 wherein the first and second contacts of both sets have a current carrying capacity at least as great as that of an equivalent 20 gauge wire.

8. The modular device according to claim 7 wherein the first and second contacts in both sets have a current carrying capacity at least as great as that of an equivalent 18 gauge wire.

9. The modular device according to any of claims 1, 7 and 8 wherein the current carrying capacity of the first and second contacts of both sets is greater than the current carrying capacity of the third contacts of both sets.

10. The modular device according to claim 9 wherein the socket is adapted to receive an RJ-11 plug.

11. An individual subscriber line module adapted to be mounted in an enclosure with a plurality of similar devices and suitable for use in a telephone network interface apparatus for connecting subscriber lines and telephone company lines, the device comprising:

(a) a housing;

(b) a first line termination device mounted on the housing for terminating the telephone company line;

(c) a second line termination device mounted on the housing for terminating the subscriber line; and (d) an electrical switch having at least two positions;

the switch in one position for connecting the telephone company and subscriber lines; and the switch in another position for disconnecting the telephone company line from the subscriber line and connecting the telephone company line to an external socket and providing a point of demarcation between the telephone company and subscriber lines for fault isolation.

12. The modular device according to claim 11 wherein the housing further includes an overvoltage protection device connected to the first line termination device.

13. The modular device according to claim 11 wherein at least one of the line termination devices comprises:

(a) an insulation displacement contact mounted on the housing;

(b) a rocker arm with a pivot for mounting the rocker arm to the housing;

(c) an opening in the rocker arm for receiving an insulated wire inserted in the opening; and (d) a cavity in the rocker arm adapted to receive the insulation displacement contact when the rocker arm is rotated to force the wire into engagement with the insulation displacement contact and the insulation displacement contact into the cavity.

14. The modular device according to claim 11 wherein the housing further includes a maintenance termination unit connected to the first line termination device.

15. The modular device according to claim 14 wherein the housing includes a half ringer connected to the first line termination device.

16. The modular device according to claim 11 wherein at least one of the line termination devices comprises:

(a) an insulation displacement contact mounted on the housing;

(b) a lever with a curved slot and a pivot point for mounting the lever to said housing;

(c) a main body having an opening for receiving an insulated wire inserted in the opening;

(d) a pin mounted on the housing and adapted to fit in the slot of the lever; and (e) a cavity in the main body adapted to receive the insulation displacement contact, rotational movement of the lever about the pivot point causing translational movement of the body, thereby forcing the wire into engagement with the insulation displacement contact and the insulation displacement contact into the cavity.

17. The modular device according to claim 16 wherein the distance between the pivot point and the slot varies between one end of the slot and the other end of the slot as the lever rotates about the pivot point.

18. A modular device adapted to be mounted in an enclosure with a plurality of similar devices and suitable for use in a telephone network interface apparatus for connecting subscriber lines and telephone company lines, the device comprising:

(a) a housing;

(b) a first line termination device mounted on the housing for terminating the telephone company line;

(c) a second line termination device mounted on the housing for terminating the subscriber line; at least one of the line termination devices having (1) an insulation displacement contact mounted on the housing, (2) a lever with a curved slot and a pivot point for mounting the lever to the housing, (3) a main body having an opening for receiving an insulated wire inserted in the opening, (4) a pin mounted on the housing and adapted to fit in the slot of the lever, and (5) a cavity in the body adapted to receive the insulation displacement contact, rotational movement of the lever about the pivot point causing translational movement of the body, thereby forcing the wire into engagement with the insulation displacement contact and the insulation displacement contact into the cavity.

19. The modular device according to claim 18 wherein the distance between the pivot point and the slot varies between one end of the slot and the other end of the slot as the lever is rotated about the pivot point.

20. The modular device according to claim 18 wherein at least one of the line termination devices comprises:

(1) an insulation displacement contact mounted on the housing, (2) a rocker arm with a pivot for mounting the rocker arm to the housing, (3) an opening in the rocker arm for receiving an insulated wire inserted in the opening; and (4) a cavity in the rocker arm adapted to receive the insulation displacement contact when the rocker arm is rotated to force the wire into engagement with the insulation displacement contact and the insulation displacement contact into the cavity.

21. The modular device according to claim 18 further comprising:

an electrical switch having at least two positions;

the switch in one position for connecting the telephone and subscriber lines; and the switch in another position for disconnecting the telephone company line from the subscriber line and connecting the telephone company line to a socket located external to the network interface device and thereby providing a point of demarcation between the telephone company and subscriber lines.

22. The modular device according to claim 18 further including an overvoltage protection device connected to the first line termination device.

23. The modular device according to claim 22 wherein the overvoltage protection device or the current limiting device forms part of a unit that is removable from the modular device.

24. The modular device according to claim 18 wherein the housing further includes a maintenance termination unit connected to the first line termination device.

25. The modular device according to claim 24 wherein the housing includes a half ringer connected to the first line termination device.

26. The modular device according to claims 24 or 25 wherein the maintenance termination unit or the half ringer forms part of a unit that is removable from the modular device.

27. The modular device according to claim 18 further including a socket, the socket having an electrical switch, the switch having two sets of first, second and third contacts, the first contacts of both sets for being connected to the telephone company line, the second contacts of both sets for being connected to the subscriber line, the first and second contacts of both sets being connected in the absence of a plug being inserted in the socket, thereby connecting the telephone company and subscriber lines, the first contacts of both sets being disconnected from the second contacts of both sets and connected to the third contacts of both sets when a plug is inserted in the socket, thereby disconnecting the telephone company line from the subscriber line and connecting the telephone company line to the third contacts of both sets which in turn connect with contacts in the plug and provide a point of demarcation between the telephone company and subscriber lines.

28. The modular device according to claim 27 wherein the first and second contacts of both sets have a current carrying capacity at least as great as that of an equivalent 20 gauge wire.

29. The modular device according to claim 28 wherein the first and second contacts of both sets have a current carrying capacity at least as great as that of an equivalent 18 gauge wire.

30. The modular device according to any of claims 27, 28 or 29 wherein the current carrying capacity of the first and second contacts of both sets is greater than the current carrying capacity of the third contacts of both sets.

31. A modular device adapted to be mounted in an enclosure with a plurality of similar devices and suitable for use in a telephone network interface apparatus for connecting subscriber lines and telephone company lines, the device comprising:
(a) a housing;
(b) a first line termination device mounted on the housing for terminating the telephone company line;
(c) a second line termination device mounted on the housing for terminating the subscriber line; at least one of the line termination devices having
  (1) an insulation displacement contact located on the housing,
  (2) a rocker arm with a pivot for mounting the rocker arm to the housing,
  (3) an opening in the rocker arm for receiving an insulated wire inserted in the opening, and
  (4) a cavity in the rocker arm adapted to receive the insulation displacement contact when the rocker arm is rotated to force the wire into engagement with the insulation displacement contact and the insulation displacement contact into the cavity.

32. The modular device according to claim 31 further comprising:
an electrical switch having at least two positions;
the switch in one position for connecting the telephone company and subscriber lines; and
the switch in another position for disconnecting the telephone company line from the subscriber line and connecting the telephone company line to an external socket and providing a point of demarcation between the telephone company and subscriber lines.

33. The modular device according to claim 31 wherein at least one of the line termination devices has
  (1) an insulation displacement contact mounted on the housing,
  (2) a lever with a curved slot and a pivot point for mounting the lever to the housing,
  (3) a main body having an opening for receiving an insulated wire inserted in the opening,
  (4) a pin mounted on the housing and adapted to fit in the slot of the lever, and
  (5) a cavity in the main body adapted to receive the insulation displacement contact, rotational movement of the lever about the pivot point causing translational movement of the body, thereby forcing the wire into engagement with the insulation displacement contact and the insulation displacement contact into the cavity.

34. The modular device according to claim 33 wherein the distance between the pivot point and the slot varies between one end of the slot and the other end of the slot as the lever is rotated about the pivot point.

35. The modular device according to claim 31 further including an overvoltage protection device connected to the first line termination device.

36. The modular device according to claim 35 wherein the overvoltage protection device forms part of a unit that is removable from the modular device.

37. The modular device according to claim 31 wherein the housing further includes a maintenance termination unit connected to the first line termination device.

38. The modular device according to claim 37 wherein the maintenance termination unit forms part of a unit that is removable from the modular device.

39. The modular device according to claim 31 further including a socket, the socket having an electrical switch, the switch having two sets of first, second and third contacts, the first contacts of both sets for being connected to the telephone company line, the second contacts of both sets for being connected to the subscriber line, the first and second contacts of both sets being connected in the absence of a plug being inserted in the socket, the first contacts of both sets being disconnected from the second contacts of both sets and connected to the third contacts of both sets when a plug is inserted in the socket, thereby disconnecting the telephone company line from the subscriber line and connecting the telephone company line to the third contacts of both sets which in turn connect with contacts in the plug and provide a point of demarcation between the telephone company and subscriber lines.

40. The modular device according to claim 39 wherein the first and second contacts of both sets have a current carrying capacity at least as great as that of an equivalent 20 gauge wire.

41. The modular device according to claim 39 wherein the first and second contacts of both sets have a current carrying capacity at least as great as that of an equivalent 18 gauge wire.

42. The modular device according to any of claims 39, 40 or 41 wherein the current carrying capacity of the first and second contacts of both sets is greater than the current carrying capacity of the third contacts of both sets.

43. A telephone network interface apparatus for connecting subscriber and telephone company lines, the apparatus comprising:
(a) an enclosure adapted to receive a plurality of similar modular devices;
(b) a socket mounted in the enclosure;
(c) a modular device adapted to be mounted in the enclosure with a plurality of similar devices, the device including:
  (1) a housing;
  (2) a first line termination device mounted on the housing for terminating the telephone company line;
  (3) a second line termination device mounted on the housing for terminating the subscriber line;
  (4) an electrical switch having at least two positions;
  the switch in one position for connecting the telephone company and subscriber lines;
  the switch in another position for disconnecting the telephone company line from the subscriber line and connecting the telephone company line to an external socket and providing a demarcation point between the telephone company and subscriber lines for fault isolation.

44. The apparatus according to claim 43 wherein the modular device includes a maintenance termination unit or a half ringer connected to the first line termination device.

45. The apparatus according to claim 43 wherein at least one of the line termination devices comprises:
(a) an insulation displacement contact mounted on said housing;
(b) a rocker arm with, a pivot for mounting the rocker arm to the housing;
(c) an opening in the rocker arm for receiving an insulated wire inserted in the opening; and
(d) a cavity in the rocker arm adapted to receive the insulation displacement contact when the rocker arm is rotated to force the wire into engagement with the insulation displacement contact and the insulation displacement contact into the cavity.

46. The apparatus according to claim 43 wherein the enclosure has a subscriber cover and a telco cover.

47. The apparatus according to claim 43 wherein at least one of the line termination devices comprises:
   a) an insulation displacement contact mounted on the housing;
   (b) a lever with a curved slot and a pivot point for mounting said lever to said housing;
   (c) a main body having an opening for receiving an insulated wire inserted in the opening;
   (d) a pin mounted to the housing and adapted to fit in the slot of the lever; and
   (e) a cavity in the main body adapted to receive the insulation displacement contact, rotational movement of the lever about the pivot point causing translational movement of the body, thereby forcing the wire into engagement with the insulation displacement contact and the insulation displacement contact into the cavity.

48. The apparatus according to claim 47 wherein the distance between the pivot point and the slot varies between one end of the slot and the other end of the slot as the lever is rotated about the pivot point.

49. A modular device adapted to be mounted in an enclosure with a plurality of similar devices and suitable for use in a telephone network interface apparatus for connecting subscriber lines and telephone company lines, the device comprising:
   (a) a housing;
   (b) a first line termination device mounted on the housing for terminating the telephone company line;
   (c) a second line termination device mounted on the housing for terminating the subscriber line; and
   (d) a socket having an electrical switch, the switch having two sets of first, second and third contacts, the first contacts of both sets for being connected to the telephone company line, the second contacts of both sets for being connected to the subscriber line, the first and second contacts of both sets being normally connected in the absence of a plug being inserted in the socket, thereby connecting the telephone company and subscriber lines, the first contacts of both sets being disconnected from the second contacts of both sets and being connected to the third contacts of both sets when a plug is inserted in the socket, thereby disconnecting the telephone company line from the subscriber line and connecting the telephone company line to the third contacts of both sets which in turn connect with contacts in the plug and provide a demarcation point between the telephone company and subscriber line.

50. The modular device according to claim 49 wherein the first and second contacts of both sets have a current carrying capacity at least as great as that of an equivalent 20 gauge wire.

51. The modular device according to claim 49 wherein the first and second contacts of both sets have a current carrying capacity at least as great as that of an equivalent 18 gauge wire.

52. The modular device according to claim 49 wherein at least one of the line termination devices comprises:
   (a) an insulation displacement contact mounted on the housing;
   (b) a lever with a curved slot and a pivot point for mounting the lever to the housing;
   (c) a main body having an opening for receiving an insulated wire inserted in the opening;
   (d) a pin mounted on the housing and adapted to fit in the slot of the lever; and
   (e) a cavity in the main body adapted to receive the insulation displacement contact, rotational movement of the lever about the pivot point causing translational movement of the body, thereby forcing the wire into engagement with the insulation displacement contact and the insulation displacement contact into the cavity.

53. The device according to claim 49 wherein at least one of the line termination devices comprises:
   (a) an insulation displacement contact mounted on the housing;
   (b) a rocker arm with a pivot for mounting the rocker arm to the housing;
   (c) an opening in the rocker arm for receiving an insulated wire inserted in the opening; and
   (d) a cavity in the rocker arm adapted to receive the insulation displacement contact when the rocker arm is rotated to force the wire into engagement with the insulation displacement contact and the insulation displacement contact into the cavity.

54. The modular device according to any of claims 49, 50 or 51 wherein the current carrying capacity of the first and second contacts of both sets is greater than the current carrying capacity of the third contacts of both sets.

55. The modular device according to claim 54 wherein the socket is adapted to receive an RJ-11 plug.

56. The device according to claim 54 wherein the distance between the pivot point and the slot varies between one end of the slot and the other end of the slot as the lever is rotated about the pivot point.

57. A modular device adapted to be mounted in an enclosure with a plurality of similar devices and suitable for use in a telephone network interface apparatus for connecting subscriber lines and telephone company lines, the modular device comprising:
   (a) a housing;
   (b) a first line termination device mounted on the housing for terminating the telephone company line;
   (c) a second line termination device mounted on the housing for terminating the subscriber line; and
   (d) a removable unit mounted on the housing, the removable unit having a socket having an electrical switch, the switch having two sets of first, second and third contacts, the first contacts of both sets for being electrically connected to the telephone company line, the second contacts of both sets for being electrically connected to the subscriber line, the first and second contacts in each set being normally connected in the absence of a plug being inserted in the socket, thereby connecting the telephone company and subscriber lines, the first contacts of both sets being disconnected from the second contacts of both sets and being connected to the third contacts of both sets when a plug is inserted in the socket, thereby disconnecting the telephone company line from the subscriber line and connecting the telephone company line to the third contacts of both sets which in turn connect with contacts in the plug and provide a demarcation point between the telephone company and subscriber line.

58. The modular device according to claim 57 wherein the first and second contacts of both sets have a current carrying capacity at least as great as that of an equivalent 20 gauge wire.

59. The modular device according to claim 57 wherein the first and second contacts of both sets have a current carrying capacity at least as great as that of an equivalent 18 gauge wire.

60. The modular device according to any of claim 57 wherein the current carrying capacity of the first and second contacts of both sets is greater than the current carrying capacity of the third contacts of both sets.

61. The modular device according to claim 57 wherein the modular unit includes a maintenance termination unit or a half ringer connected to the first line termination device.

62. The modular device according to claim 57 wherein the removable unit includes both a maintenance termination unit and a half ringer.

63. The modular device according to claim 57 wherein the socket is adapted to accept an RJ-11 plug.

* * * * *